United States Patent
Cook et al.

(10) Patent No.: US 10,251,127 B2
(45) Date of Patent: Apr. 2, 2019

(54) WIRELESS DEVICE SIGNAL AMPLIFIER

(71) Applicant: WILSON ELECTRONICS, LLC, St. George, UT (US)

(72) Inventors: Patrick Lee Cook, Cedar City, UT (US); Christopher K. Ashworth, St. George, UT (US); Michael James Mouser, Parker, TX (US)

(73) Assignee: WILSON ELECTRONICS, LLC, St. george, UT (US)

( * ) Notice: Subject to any disclaimer, the term of this patent is extended or adjusted under 35 U.S.C. 154(b) by 0 days.

(21) Appl. No.: 15/240,674

(22) Filed: Aug. 18, 2016

(65) Prior Publication Data
US 2017/0055215 A1 Feb. 23, 2017

Related U.S. Application Data

(60) Provisional application No. 62/206,423, filed on Aug. 18, 2015.

(51) Int. Cl.
| | |
|---|---|
| *H04W 52/52* | (2009.01) |
| *H04W 88/04* | (2009.01) |
| *H04B 7/04* | (2017.01) |
| *H04B 7/155* | (2006.01) |
| *H04W 52/02* | (2009.01) |

(Continued)

(52) U.S. Cl.
CPC .......... *H04W 52/0229* (2013.01); *H04B 7/04* (2013.01); *H04B 7/155* (2013.01); *H04B 7/15557* (2013.01); *H04L 43/028* (2013.01); *H04L 43/16* (2013.01); *H04W 40/22* (2013.01); *H04W 52/52* (2013.01); *H04W 88/04* (2013.01); *H04W 88/08* (2013.01); *Y02D 70/00* (2018.01); *Y02D 70/1222* (2018.01); *Y02D 70/1262* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/446* (2018.01)

(58) Field of Classification Search
None
See application file for complete search history.

(56) References Cited

U.S. PATENT DOCUMENTS

| | | |
|---|---|---|
| 4,776,032 A | 10/1988 | Odate et al. |
| 5,303,395 A | 4/1994 | Dayani |

(Continued)

FOREIGN PATENT DOCUMENTS

| | | |
|---|---|---|
| EP | 1525678 B1 | 7/2008 |
| WO | WO 2005/025078 | 3/2005 |

OTHER PUBLICATIONS

ADL5513; "1 MHz to 4 GHz, 80 dB Logarithmic Detector / Controller"; Data Sheet; (2008); 25 pages.

(Continued)

*Primary Examiner* — David Bilodeau
(74) *Attorney, Agent, or Firm* — Thorpe North & Western

(57) ABSTRACT

Technology for a signal booster is disclosed. The signal booster can include a signal amplifier configured to amplify and filter signals for a wireless device. The signal booster can include one or more detectors configured to detect power levels of the signals. The signal amplifier can include at least one of: one or more bypassable amplifiers or one or more switchable band pass filters that are configurable depending on detected power levels of the signals.

23 Claims, 14 Drawing Sheets

(51) Int. Cl.
*H04L 12/26* (2006.01)
*H04W 40/22* (2009.01)
*H04W 88/08* (2009.01)

(56) References Cited

U.S. PATENT DOCUMENTS

| | | | |
|---|---|---|---|
| 5,737,687 A | 4/1998 | Martin et al. | |
| 5,777,530 A | 7/1998 | Nakatuka | |
| 5,835,848 A | 11/1998 | Bi et al. | |
| 6,005,884 A | 12/1999 | Cook et al. | |
| 6,671,502 B1 | 12/2003 | Ogawa | |
| 6,711,388 B1 | 3/2004 | Neitiniemi | |
| 6,889,033 B2 | 5/2005 | Bongfeldt | |
| 6,990,313 B1 | 1/2006 | Yarkosky | |
| 7,035,587 B1 | 4/2006 | Yarkosky | |
| 7,221,967 B2 | 5/2007 | Van Buren et al. | |
| 7,974,573 B2 | 7/2011 | Dean | |
| 8,867,572 B1 | 10/2014 | Zhan | |
| 9,048,940 B2 | 6/2015 | Wilhite | |
| 2002/0044594 A1 | 4/2002 | Bongfeldt | |
| 2003/0081694 A1 | 5/2003 | Wieck | |
| 2003/0123401 A1 | 7/2003 | Dean | |
| 2004/0137854 A1 | 7/2004 | Ge | |
| 2004/0146013 A1 | 7/2004 | Song et al. | |
| 2004/0166802 A1 | 8/2004 | McKay, Sr. et al. | |
| 2004/0219876 A1 | 11/2004 | Baker et al. | |
| 2004/0235417 A1 | 11/2004 | Dean | |
| 2005/0118949 A1 | 6/2005 | Allen et al. | |
| 2005/0215204 A1* | 9/2005 | Wallace | H04B 1/1036 455/78 |
| 2006/0084379 A1 | 4/2006 | O'Neill | |
| 2006/0148401 A1 | 7/2006 | Roper et al. | |
| 2007/0071128 A1 | 3/2007 | Meir et al. | |
| 2007/0188235 A1 | 8/2007 | Dean | |
| 2008/0081555 A1 | 4/2008 | Kong et al. | |
| 2008/0096483 A1 | 4/2008 | Van Buren et al. | |
| 2008/0161076 A1 | 7/2008 | Min | |
| 2008/0278237 A1 | 11/2008 | Blin | |
| 2009/0181735 A1 | 7/2009 | Griffin, Jr. et al. | |
| 2009/0270027 A1 | 10/2009 | O'Neill | |
| 2011/0151775 A1 | 6/2011 | Kang et al. | |
| 2011/0176635 A1 | 7/2011 | Hochwald et al. | |
| 2013/0149957 A1 | 6/2013 | Desclos et al. | |
| 2013/0157720 A1 | 6/2013 | Schiff | |
| 2014/0065949 A1 | 3/2014 | Wilhite | |
| 2014/0266424 A1 | 9/2014 | Ashworth et al. | |
| 2014/0273816 A1 | 9/2014 | Ashworth et al. | |
| 2015/0009889 A1 | 1/2015 | Zhan | |
| 2016/0308276 A1 | 10/2016 | Chang et al. | |
| 2017/0055215 A1 | 2/2017 | Cook et al. | |
| 2017/0055231 A1 | 2/2017 | Cook et al. | |

OTHER PUBLICATIONS

HMC713LP3E; "54 dB, Logarithmic Detector / Controller, 50—8000 MHz"; Data Sheet (2010); 12 pages.
HMC909LP4E; "RMS Power Detector Single-Ended, DC—5.8 GHz"; Data Sheet; (2010); 21 pages.
PIC16F873; "28/40-Pin 8-Bit CMOS FLASH Microcontrollers"; Data Sheet; (2001); 218 pages.
3GPP2 C.S0011-B; "Recommended Minimum Performance Standards for cdma2000® Spread Spectrum Mobile Stations"; TIA-98-E; (Dec. 13, 2002); 448 pages; Release B, Version 1, Revision E.

* cited by examiner

WIRELESS DEVICE SIGNAL AMPLIFIER

RELATED APPLICATIONS

The present application claims priority to U.S. Provisional Patent Application No. 62/206,423, filed Aug. 18, 2015, the entire specification of which is hereby incorporated by reference in its entirety for all purposes.

BACKGROUND

Signal boosters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via the antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
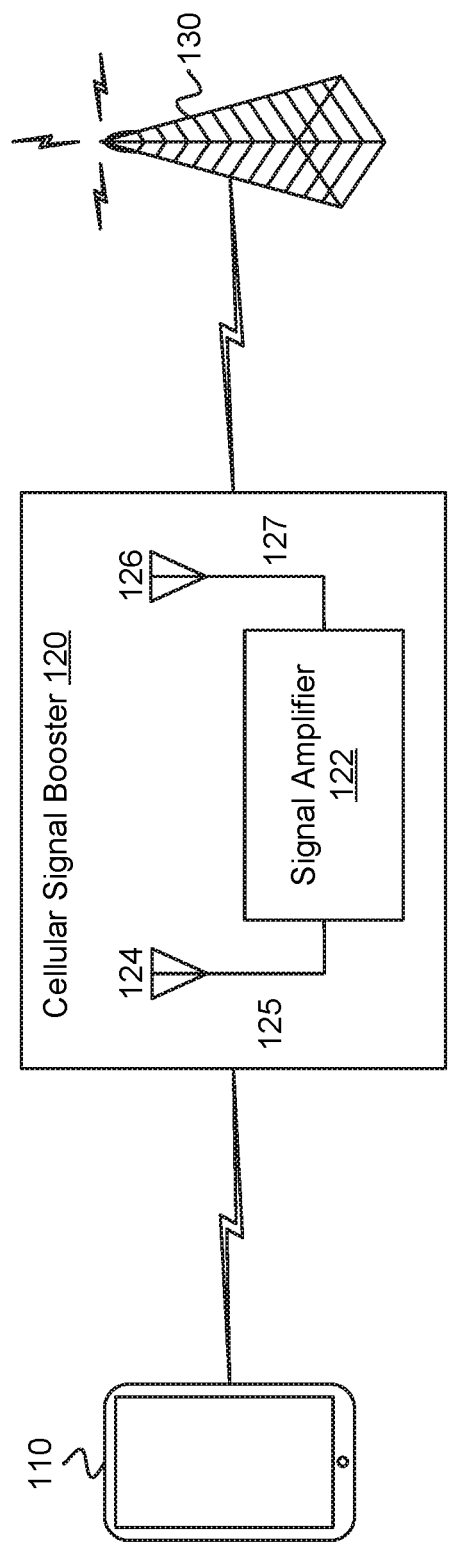
FIG. 1 illustrates a signal booster in communication with a wireless device and a base station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates an exemplary signal booster 120 in communication with a wireless device 110 and a base station 130. The signal booster 120 can be referred to as a repeater or signal amplifier. A repeater can be an electronic device used to amplify (or boost) signals. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the integrated node antenna 126 via the second coaxial cable 127 or other type of radio frequency connection operable to communicate radio frequency signals. The integrated device antenna 126 can communicate the uplink signal that has been amplified and filtered to the base station 130.

In one example, the signal booster 120 can send uplink signals to a node and/or receive downlink signals from the node. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one example, the signal booster 120 can amplify uplink signals, and then send amplified uplink signals to the node. Alternatively, the uplink signals can be passed without amplification or filtering. For example, the uplink signals can be communicated from the wireless device 110 to the node (e.g., eNodeB) while bypassing the signal booster 120.

In one configuration, the signal booster 120 used to amplify the uplink and/or a downlink signal is a handheld booster. The handheld booster can be implemented in a sleeve (or case) of the wireless device 110. The wireless device sleeve may be attached to the wireless device 110, but may be removed as needed. In this configuration, the signal booster 120 can automatically power down or cease amplification when the wireless device 110 approaches a particular base station. In other words, the signal booster 120 may determine to stop performing signal amplification when the quality of uplink and/or downlink signals is above a defined threshold based on a location of the wireless device 110 in relation to the base station 130.

In one example, the signal booster 120 can include a battery to provide power to various components, such as the signal amplifier 122, the integrated device antenna 124 and the integrated node antenna 126. The battery can also power the wireless device 110 (e.g., phone or tablet). Alternatively, the signal booster 120 can receive power from the wireless device 110.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the handheld booster can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R.

The signal booster 120 can be configured to automatically self-monitor its operation to ensure compliance with applicable noise and gain limits. The signal booster 120 can either self-correct or shut down automatically if the signal booster's operations violate the regulations defined in FCC Part 20.21.

In one configuration, the signal booster 120 can improve the wireless connection between the wireless device 110 and the base station 130 (e.g., cell tower) or another type of wireless wide area network (WWAN) access point (AP). The signal booster 120 can boost signals for cellular standards, such as the Third Generation Partnership Project (3GPP) Long Term Evolution (LTE) Release 8, 9, 10, 11, 12 or 13 standards or Institute of Electronics and Electrical Engineers (IEEE) 802.16. In one configuration, the signal booster 120 can boost signals for 3GPP LTE Release 12.0.0 (July 2013) or other desired releases. The signal booster 120 can boost signals from the 3GPP Technical Specification 36.101 (Release 12 Jun. 2015) bands or LTE frequency bands. For example, the signal booster 120 can boost signals from the LTE frequency bands: 2, 4, 5, 12, 13, 17, and 25. The signal booster 120 can boost selected frequency bands based on the country or region in which the signal booster is used. In addition, the signal booster 120 can boost time division duplexing (TDD) and/or frequency division duplexing (FDD) signals.

The number of LTE frequency bands and the level of signal improvement can vary based on a particular wireless device, cellular node, or location. Additional domestic and international frequencies can also be included to offer increased functionality. Selected models of the signal booster 120 can be configured to operate with selected frequency bands based on the location of use. In another example, the signal booster 120 can automatically sense from the wireless device 110 or base station 130 (or GPS, etc.) which frequencies are used, which can be a benefit for international travelers.

In one example, the integrated device antenna 124 and the integrated node antenna 126 can be comprised of a single antenna, an antenna array, or have a telescoping form-factor. In another example, the integrated device antenna 124 and the integrated node antenna 126 can be a microchip antenna. An example of a microchip antenna is AMMAL001. In yet another example, the integrated device antenna 124 and the integrated node antenna 126 can be a printed circuit board (PCB) antenna. An example of a PCB antenna is TE 2118310-1.

In one example, the integrated device antenna 124 can receive uplink (UL) signals from the wireless device 100 and transmit DL signals to the wireless device 100 using a single antenna. Alternatively, the integrated device antenna 124 can receive UL signals from the wireless device 100 using a dedicated UL antenna, and the integrated device antenna 124 can transmit DL signals to the wireless device 100 using a dedicated DL antenna.

In one example, the integrated device antenna 124 can wireless communicate with one or more antennas in the wireless device 110. In another example, the integrated device antenna 124 can be coupled to one or more antennas in the wireless device 110. In addition, the integrated device antenna 124 can communicate with the wireless device 110 using near field communication, or alternatively, the integrated device antenna 124 can communicate with the wireless device 110 using far field communication.

In one example, the integrated node antenna 126 can receive downlink (DL) signals from the base station 130 and transmit uplink (UL) signals to the base station 130 via a single antenna. Alternatively, the integrated node antenna 126 can receive DL signals from the base station 130 using a dedicated DL antenna, and the integrated node antenna 126 can transmit UL signals to the base station 130 using a dedicated UL antenna.

In one configuration, multiple signal boosters can be used to amplify UL and DL signals. For example, a first signal booster can be used to amplify UL signals and a second signal booster can be used to amplify DL signals. In addition, different signal boosters can be used to amplify different frequency ranges.

In one configuration, when the signal booster 120 is a handheld booster, a phone-specific case of the handheld booster can be configured for a specific type or model of wireless device. The phone-specific case can be configured with the integrated device antenna 124 located at a desired location to enable communication with an antenna of the specific wireless device. In addition, amplification and filtering of the uplink and downlink signals can be provided to optimize the operation of the specific wireless device. In one example, the handheld booster can be configured to communicate with a wide range of wireless devices. In another example, the handheld booster can be adjustable to be configured for multiple wireless devices.

In one configuration, when the signal booster 120 is a handheld booster, the handheld booster can be configured to identify when the wireless device 110 receives a relatively strong downlink signal. An example of a strong downlink signal can be a downlink signal with a signal strength greater than approximately −80 dBm. The handheld booster can be configured to automatically turn off selected features, such as amplification, to conserve battery life. When the handheld booster senses that the wireless device 110 is receiving a relatively weak downlink signal, the integrated booster can be configured to provide amplification of the downlink signal. An example of a weak downlink signal can be a downlink signal with a signal strength less than −80 dBm.

In one example, the handheld booster can be designed, certified and produced in view of a specific absorption rate (SAR). Many countries have SAR limits which can limit the amount of RF radiation that can be transmitted by a wireless device. This can protect users from harmful amounts of radiation being absorbed in their hand, body, or head. In one example, when allowable SAR values are exceeded, a telescoping integrated node antenna may help to remove the radiation from the immediate area of the user. In another example, the handheld booster can be certified to be used away from a user, such as in use with Bluetooth headsets, wired headsets, and speaker-phones to allow the SAR rates to be higher than if the handheld booster were used in a location adjacent a user's head. Additionally, Wi-Fi communications can be disabled to reduce SAR values when the SAR limit is exceeded.

In one example, mobile devices are often already at a SAR limit, and the handheld booster can potentially increase the SAR. Therefore, in order to reduce the SAR, the mobile device antenna can be blocked from increasing the SAR. For example, a portion of the mobile device can be wrapped in a defined type of metal (e.g., aluminum) or radio frequency (RF) absorbent can be placed between the mobile device and the metal. These techniques can reduce reflections and increase stability, thereby reducing the SAR.

In one example, mobile devices can be designed from a limited space/weight perspective, such that mobile device antennas can be compromised. Therefore, the handheld booster can provide an improved integrated node antenna (for communication with a base station). The integrated node antenna can be in a computer chip, printed circuit board (PCB), array, beam-forming array or a telescoping form-factor.

In one example, the handheld booster can also include one or more of: a waterproof casing, a shock absorbent casing, a flip-cover, a wallet, or extra memory storage for the wireless device. In one example, extra memory storage can be achieved with a direct connection between the handheld booster and the wireless device 110. In another example, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, or IEEE 802.11ad can be used to couple the handheld booster with the wireless device 110 to enable data from the wireless device 110 to be communicated to and stored in the extra memory storage that is integrated in the handheld booster. Alternatively, a connector can be used to connect the wireless device 110 to the extra memory storage.

In one example, the handheld booster can include photovoltaic cells or solar panels as a technique of charging the integrated battery and/or a battery of the wireless device 110. In another example, the handheld booster can be configured to communicate directly with other wireless devices with handheld boosters. In one example, the integrated node antenna 126 can communicate over Very High Frequency (VHF) communications directly with integrated node antennas of other handheld boosters. The handheld booster can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band. Examples of such ISM bands include 2.4 GHz, 3.6 GHz, 4.9 GHz, 5 GHz, or 5.9 GHz. This configuration can allow data to pass at high rates between multiple wireless devices with handheld boosters. This configuration can also allow users to send text messages, initiate phone calls, and engage in video communications between wireless devices with handheld boosters. In one example, the integrated node antenna 126 can be configured to couple to the wireless device 110. In other words, communications between the integrated node antenna 126 and the wireless device 110 can bypass the integrated booster.

In another example, a separate VHF node antenna can be configured to communicate over VHF communications directly with separate VHF node antennas of other handheld boosters. This configuration can allow the integrated node antenna 126 to be used for simultaneous cellular communications. The separate VHF node antenna can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band. In another example, the handheld booster can be configured to determine the SAR value. The handheld booster can be configured to disable cellular communications or Wi-Fi communications when a SAR limit is exceeded.

In one configuration, the signal booster 120 can be configured for satellite communication. In one example, the integrated node antenna 126 can be configured to act as a satellite communication antenna. In another example, a separate node antenna can be used for satellite communications. The signal booster 120 can extend the range of coverage of the wireless device 110 configured for satellite communication. The integrated node antenna 126 can receive downlink signals from satellite communications for the wireless device 110. The signal booster 120 can filter and amplify the downlink signals from the satellite communication. In another example, during satellite communications, the wireless device 110 can be configured to couple to the signal booster 120 via a direct connection or an ISM radio band. Examples of such ISM bands include 2.4 GHz, 3.6 GHz, 4.9 GHz, 5 GHz, or 5.9 GHz.

Figure 2:
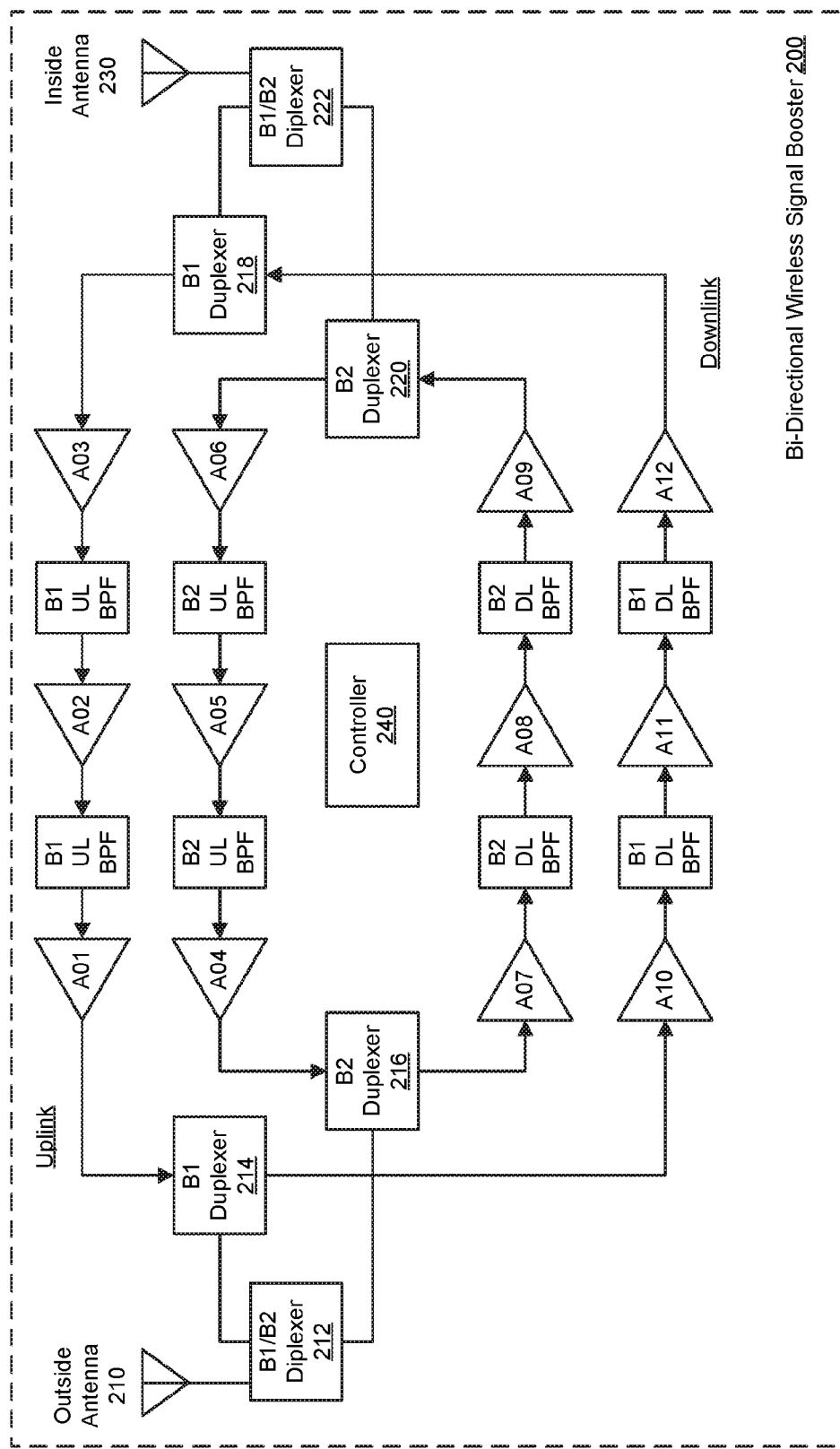
FIG. 2 illustrates a cellular signal booster configured to amplify uplink (UL) and downlink (DL) signals using one or more downlink signal paths and one or more uplink signal paths in accordance with an example.

FIG. 2 illustrates an exemplary bi-directional wireless signal booster 200 configured to amplify uplink (UL) and downlink (DL) signals using a separate signal path for each UL frequency band and DL frequency band and a controller 240. An outside antenna 210, or an integrated node antenna, can receive a downlink signal. For example, the downlink signal can be received from a base station (not shown). The downlink signal can be provided to a first B1/B2 diplexer 212, wherein B1 represents a first frequency band and B2 represents a second frequency band. The first B1/B2 diplexer 212 can create a B1 downlink signal path and a B2 downlink signal path. Therefore, a downlink signal that is associated with B1 can travel along the B1 downlink signal path to a first B1 duplexer 214, or a downlink signal that is associated with B2 can travel along the B2 downlink signal path to a first B2 duplexer 216. After passing the first B1 duplexer 214, the downlink signal can travel through a series of amplifiers (e.g., A10, A11 and A12) and downlink band pass filters (BPF) to a second B1 duplexer 218. Alternatively, after passing the first B2 duplexer 216, the downlink can travel through a series of amplifiers (e.g., A07, A08 and A09) and downlink band pass filters (BFF) to a second B2 duplexer 220. At this point, the downlink signal (B1 or B2) has been amplified and filtered in accordance with the type of amplifiers and BPFs included in the bi-directional wireless signal booster 200. The downlink signals from the second B1 duplexer 218 or the second B2 duplexer 220, respectively, can be provided to a second B1/B2 diplexer 222. The second B1/B2 diplexer 222 can provide an amplified downlink signal to an inside antenna 230, or an integrated device antenna. The inside antenna 230 can communicate the amplified downlink signal to a wireless device (not shown), such as a mobile phone.

In one example, the inside antenna 230 can receive an uplink (UL) signal from the wireless device. The uplink signal can be provided to the second B1/B2 diplexer 222. The second B1/B2 diplexer 222 can create a B1 uplink signal path and a B2 uplink signal path. Therefore, an uplink signal that is associated with B1 can travel along the B1 uplink signal path to the second B1 duplexer 218, or an uplink signal that is associated with B2 can travel along the B2 uplink signal path to the second B2 duplexer 222. After passing the second B1 duplexer 218, the uplink signal can travel through a series of amplifiers (e.g., A01, A02 and A03) and uplink band pass filters (BPF) to the first B1 duplexer 214. Alternatively, after passing the second B2 duplexer 220, the uplink signal can travel through a series of amplifiers (e.g., A04, A05 and A06) and uplink band pass filters (BPF) to the first B2 duplexer 216. At this point, the uplink signal (B1 or B2) has been amplified and filtered in accordance with the type of amplifiers and BFFs included in the bi-directional wireless signal booster 200. The uplink signals from the first B1 duplexer 214 or the first B2 duplexer 216, respectively, can be provided to the first B1/B2 diplexer 212. The first B1/B2 diplexer 212 can provide an amplified uplink signal to the outside antenna 210. The outside antenna can communicate the amplified uplink signal to the base station.

In one example, the bi-directional wireless signal booster 200 can be a 6-band booster. In other words, the bi-directional wireless signal booster 200 can perform amplification and filtering for downlink and uplink signals having a frequency in bands B1, B2, B3 B4, B5 and/or B6.

In one example, the bi-directional wireless signal booster 200 can use the duplexers to separate the uplink and downlink frequency bands, which are then amplified and filtered separately. A multiple-band cellular signal booster can typically have dedicated radio frequency (RF) amplifiers (gain blocks), RF detectors, variable RF attenuators and RF filters for each uplink and downlink band.

Figure 3:
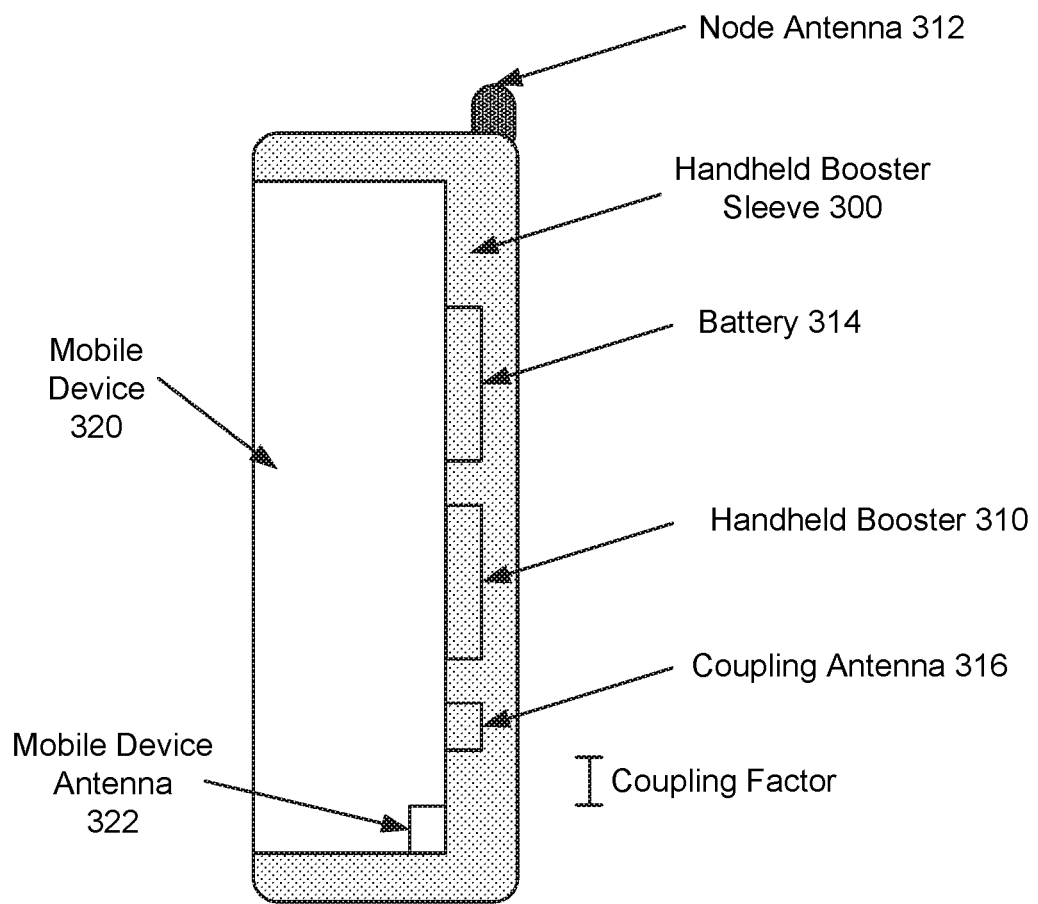
FIG. 3 illustrates a handheld booster implemented in a handheld booster sleeve in accordance with an example.

FIG. 3 illustrates an exemplary configuration of a handheld booster 310 implemented in a handheld booster sleeve 300. The handheld booster sleeve 300 may hold the handheld booster 310, as well as a mobile device 320 with a mobile device antenna 322. The handheld booster sleeve 300 can be removable, such that the mobile device 320 can be inserted and removed from the handheld booster sleeve 300. The handheld booster 310 can incorporate a node antenna 312 and a coupling antenna 316 (also referred to as an integrated device antenna). The handheld booster sleeve 300 an incorporate the handheld booster 310, the node antenna 312 and the coupling antenna 316 in a single form-factor. The handheld booster sleeve 300 can protect the mobile device 320 and the handheld booster 310.

The handheld booster 310 may amplify signals received from the mobile device 320 and/or signals transmitted to the mobile device 320. For example, the handheld booster 300 can receive downlink signals from a base station (not shown) via the node antenna 312, and the downlink signals can be amplified and then provided to the mobile device 320 via the coupling antenna 316. As another example, the handheld booster 300 can receive uplink signals from the mobile device 320 via the coupling antenna 316, and the uplink signals can be amplified and then provided to the base station via the node antenna 312. In one example, the handheld booster 310 can provide up to a 6 decibel (dB) improvement to the cellular signal.

In one example, the handheld booster sleeve 310 can include a battery 314. The battery 314 in the handheld booster sleeve 300 can provide power the booster active components. The battery 314 can also power the mobile device 320 (i.e. phone or tablet). Alternatively, the handheld booster 310 can receive power from the mobile device 320.

In one example, in order to minimize power loss between the coupling antenna 316 of the handheld booster 310 and the mobile device antenna 322, the coupling antenna 316 can be substantially aligned with the mobile device antenna 322. However, aligning the coupling antenna 316 in the handheld booster 310 with the mobile device antenna 322 can cause the mobile device antenna 322 to be dependent on the coupling antenna 316. In other words, the antenna in the mobile device 320 may not be used independently since it is covered by the coupling antenna 316. Therefore, in one example, the position of the coupling antenna 316 can be offset from the mobile device antenna 322 by a coupling distance. The coupling distance, or distance between the mobile device antenna 322 and the coupling antenna 316, can form a simultaneous bypass path. A selected distance between the mobile device antenna 322 and the coupling antenna 316 can act as a bypass for non-amplified signals to be transmitted and/or received via the mobile device antenna 322 without entering the handheld booster 310, which can allow for significant power savings by not amplifying all mobile device UL and DL signals.

In one example, increasing the spacing between the coupling antenna 316 and the mobile device antenna 322 can increase coupling loss and reduce interference for the simultaneous bypass path. However, increasing the gain of the handheld booster 310 can overcome the increased coupling loss while maintaining the bypass for non-amplified signals.

In one example, the coupling antenna 316 can be coupled with a primary antenna of the mobile device 320. The mobile device 320 can include a secondary antenna. The coupling antenna 316 can be coupled with the primary antenna of the mobile device 320 at a predetermined distance, such that the primary antenna can be considered blocked by the mobile device 320. When the mobile device 320 considers the primary antenna blocked, the secondary antenna can be used to transmit and receive UL or DL signals. In one example, the handheld booster 310 can amplify DL signals, and the coupling antenna 316 can transmit the amplified DL signals to the primary antenna of the mobile device 320. Thus, the secondary antenna of the mobile device 320 can be used directly for UL communications with the base station.

In previous solutions, mobile device sleeves fail to incorporate an integrated signal booster, and particularly not a Federal Communications Commission (FCC)-compatible consumer signal booster. In contrast, as shown, the handheld booster sleeve 300 can incorporate the handheld booster 310, and the handheld booster 310 can be an FCC-compatible consumer signal booster.

In one example, the handheld booster 310 can detect and mitigate unintended oscillations in uplink and downlink bands. The handheld booster 310 can be configured to automatically power down or cease amplification as the mobile device 320 approaches an affected base station.

In one example, the handheld booster 310 can enable a cellular connection, increase data rates and/or increase performance in otherwise poor-connection areas. The handheld booster 310 can be used in series with a standard signal booster to improve performance.

Typically, mobile devices can have an increased noise figure (e.g., 5-6 dB) when the mobile devices do not use low-noise amplifiers (LNAs) on their radio frequency (RF) front-end receiving paths. However, the handheld booster 300 can lower the noise figure (e.g., to approximately 1-2 dB) by using one or more LNAs.

In one configuration, a separate sleeve-to-sleeve node antenna can be configured to communicate directly with separate sleeve-to-sleeve node antennas of other handheld boosters. This configuration can allow the node antenna 312 to be used for simultaneous cellular communications. The separate sleeve-to-sleeve node antenna can communicate with the mobile device 320 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band.

In one example, the handheld booster 310 can determine the SAR value. The handheld booster can be configured to disable cellular communications or Wi-Fi communications when a SAR limit is exceeded.

Figure 4:
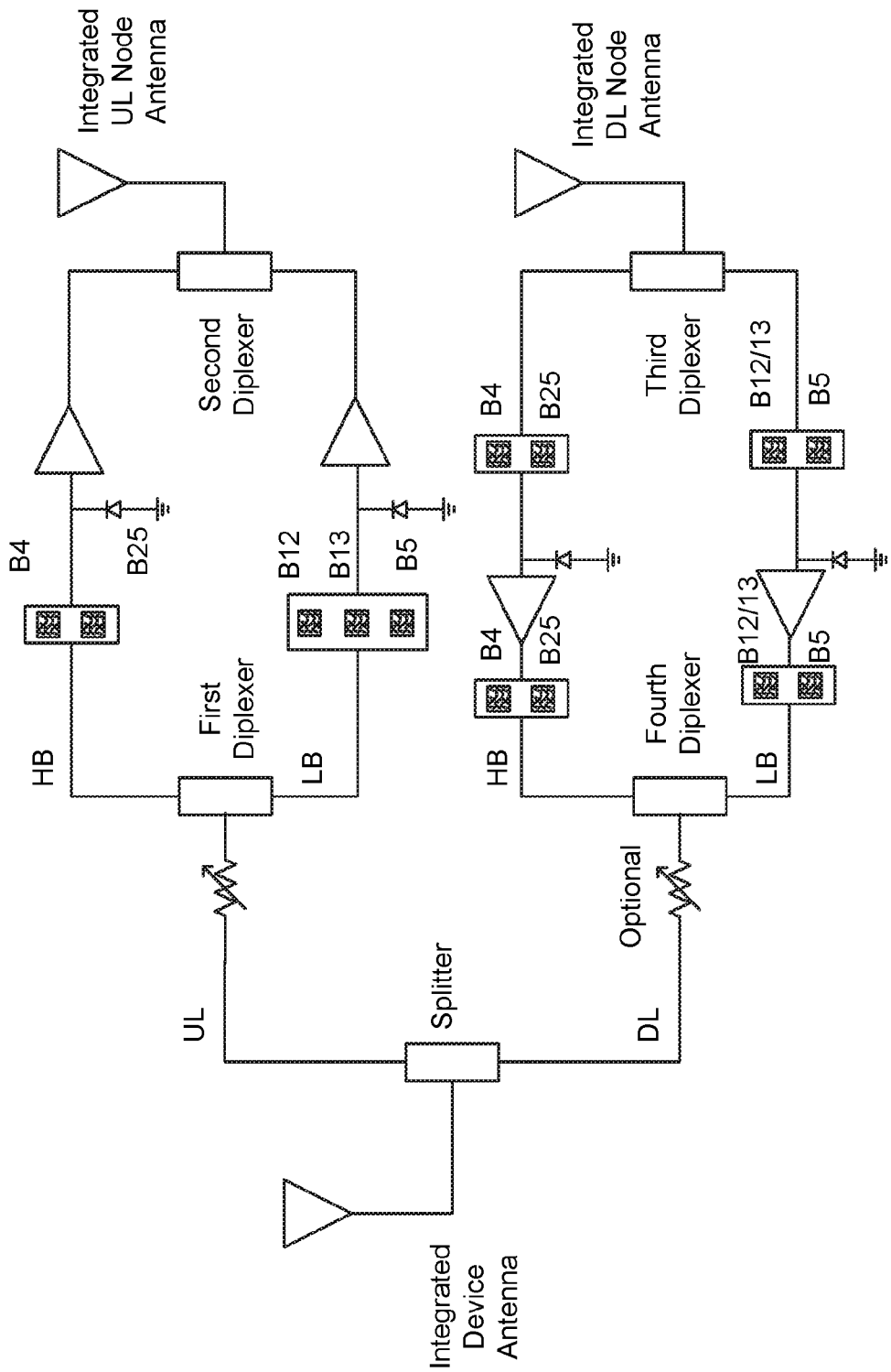
FIG. 4 illustrates a cellular signal amplifier configured to amplify uplink (UL) and downlink (DL) signals in accordance with an example.

FIG. 4 illustrates an exemplary cellular signal amplifier configured to amplify uplink (UL) and downlink (DL) signals. The cellular signal amplifier can include an integrated device antenna, an integrated UL node antenna and an integrated DL node antenna. In one example, the amplification of UL and DL signals can be limited to a gain of less than or equal to 23 dB. A separate cellular signal amplifier or separate antenna for UL and DL communications can increase the UL or DL signal output power by eliminating the need for filtering on a power amplifier output.

In one example, the integrated device antenna can receive an UL signal from a wireless device. The UL signal can be directed to a splitter, and then the UL signal can be directed to first diplexer. The first diplexer can direct the UL signal to an UL high band signal path or a UL low band signal path (depending on whether the UL signal is a high band signal or a low band signal). The UL high band signal path and the UL low band signal path can each include a single input single output (SISO) bandpass filter. For the UL high band signal path, the SISO bandpass filter can filter signals in LTE frequency bands 4 and 25. For the UL low band signal path, the SISO bandpass filter can filter signals in LTE frequency bands 5, 12 and 13. The first diplexer can appropriately direct the UL signal to the high band signal path or the low band signal path, in which the UL signal can be filtered and amplified using a low-noise amplifier (LNA). The filtered and amplified UL signal can be passed to a second diplexer, and then to the integrated UL node antenna, which can transmit the UL signal to a base station.

In one example, the integrated DL node antenna can receive a DL signal from the base station. The DL signal can be directed to a third diplexer, which can direct the DL signal to a DL high band signal path or a DL low band signal path. The DL high band signal path and the DL low band signal path can each include a single input single output (SISO) bandpass filter. For the DL high band signal path, the SISO bandpass filter can filter signals in LTE frequency bands 4 and 25. For the DL low band signal path, the SISO bandpass filter can filter signals in LTE frequency bands 5, 12 and 13. The DL signal can be filtered and amplified in either the DL high band signal path or the DL low band signal path, and then the DL signal can be passed to a fourth diplexer. The fourth diplexer can direct the DL signal to the splitter, and then to the integrated device antenna, which can transmit the DL signal to the wireless device. In one example, an attenuator can be positioned between the integrated device antenna and the splitter to reduce reflections.

In one configuration, separate UL and DL integrated device antennas can be used to avoid splitter or duplexer (front-end) losses. By using separate UL and DL integrated device antennas, UL output power and DL sensitivity can be increased.

Figure 5:
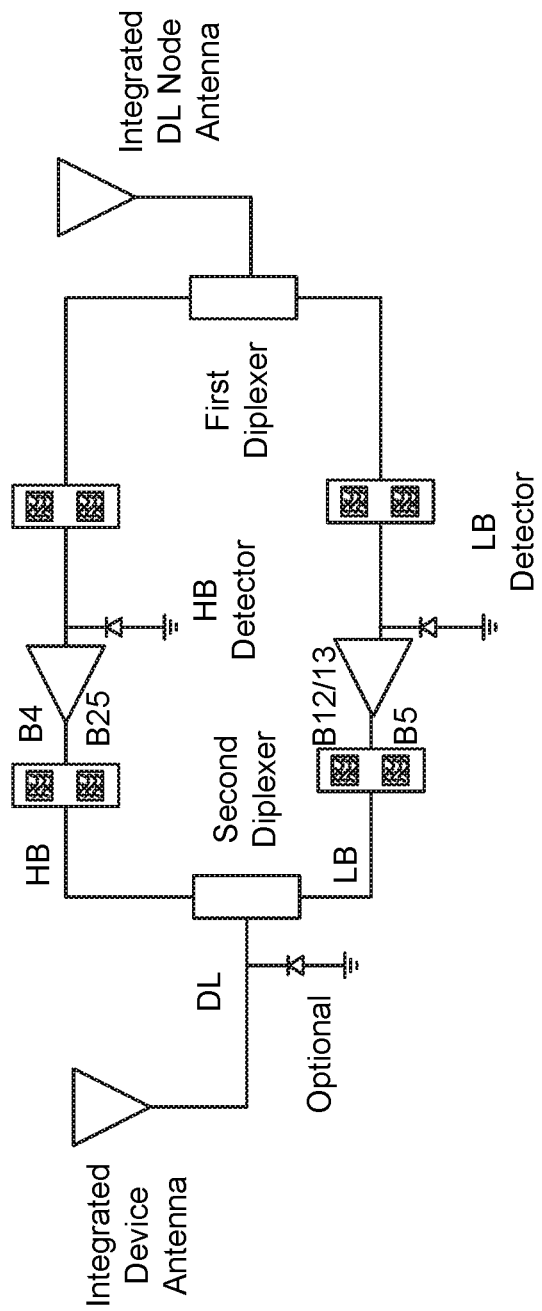
FIG. 5 illustrates a cellular signal amplifier configured to amplify DL signals in accordance with an example.

FIG. 5 illustrates an exemplary cellular signal amplifier configured to amplify downlink (DL) signals. An integrated DL node antenna can receive a DL signal from a base station. The DL signal can be directed to a first diplexer, which can direct the DL signal to a DL high band (HB) signal path or a DL low band (LB) signal path. The DL high band signal path and the DL low band signal path can each include one or more single input single output (SISO) bandpass filters and one or more amplifiers. For the DL high band signal path, the SISO bandpass filter(s) can filter signals in LTE frequency bands 4 and 25. For the DL low band signal path, the SISO bandpass filter(s) can filter signals in LTE frequency bands 5, 12 and 13. The DL signal can be filtered and amplified in either the DL high band signal path or the DL low band signal path. The amplification of the DL signals can be limited to a gain of less than or equal to 9 dB. Then, the DL signal can be passed to a second diplexer. The second diplexer can direct the DL signal to an integrated device antenna, which can transmit the DL signal to a wireless device.

In one example, the DL high band signal path can include a HB detector. The HB detector can be a diode. The HB detector can detect a DL signal received from the integrated DL node antenna via the first diplexer. The HB detector can detect a power level of the DL signal, and when the power level of the DL signal is greater than a selected threshold, the cellular signal amplifier can be turned off. In other words, the DL signal may not need to be amplified, so the cellular signal amplifier can be turned off to conserve power. When the HB detector detects that the power level of the DL signal is less than a selected threshold, the cellular signal amplifier can be turned on. Therefore, the cellular signal amplifier can be engaged or disengaged depending on the power level of the DL signal.

Similarly, the DL low band signal path can include a LB detector. The LB detector can be a diode. The LB detector can detect a DL signal received from the integrated DL node antenna via the first diplexer. The LB detector can detect a power level of the DL signal, and when the power level of the DL signal is greater than a selected threshold, the cellular signal amplifier can be turned off. When the LB detector detects that the power level of the DL signal is less than a selected threshold, the cellular signal amplifier can be turned on.

In one configuration, the mobile device can include a primary antenna and a secondary antenna. For example, the mobile device can use the secondary antenna when the primary antenna is not working. In addition, when the primary antenna is used for a DL-only signal amplification and filtering path (as shown in FIG. 5), the mobile device can use the secondary antenna to transmit UL signals. In other words, the primary antenna can be used for DL signals, and the secondary antenna can be used for UL signals. In this configuration, the UL signal transmitted from the mobile device may not be amplified by the cellular signal amplifier.

In one example, the lack of UL amplification can lead to a less than 9 dB system gain. In another example, the cellular signal amplifier can include a detector that can detect an UL signal, and then determine whether to turn the DL amplification path on or off.

Figure 6:
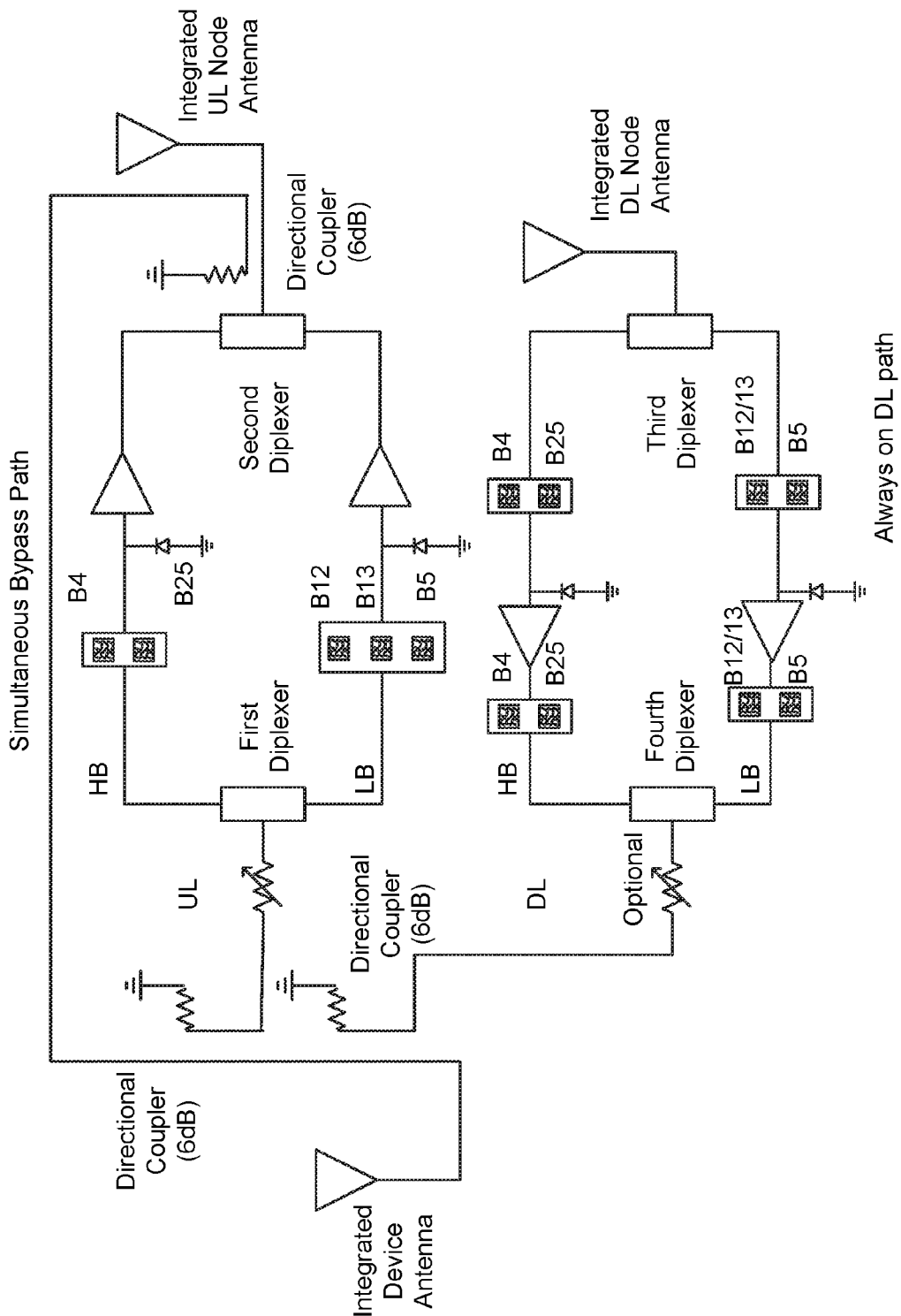
FIG. 6 illustrates a cellular signal amplifier configured with a simultaneous bypass path in accordance with an example.

FIG. 6 illustrates an exemplary cellular signal amplifier configured with a simultaneous bypass path. The cellular signal amplifier can amplify downlink (DL) and uplink (UL) signals. However, the cellular signal amplifier can amplify either DL or UL signals at a given time and allow UL non-amplified signals to simultaneously bypass amplification. In other words, the cellular signal amplifier can detect a power level of an UL signal. The power level of the UL signal can be detected using a detector (e.g., a diode). Based on a signal power level in relation to a defined threshold, the cellular signal amplifier can determine that the UL signal does not need amplification and can bypass either a high band or low band uplink signal amplification path. For example, when the signal power level is above the defined threshold, the UL signal can bypass the high band or low band uplink signal amplification path. On the other hand, when the signal power level is below the defined threshold, the UL signal can be directed to one of the high band or low band uplink signal amplification path. In one example, DL signals can always be directed to a high band or low band downlink signal amplification path of the cellular signal amplifier.

In one example, when the UL signal is not amplified, the integrated device antenna can be directly coupled to the integrated UL node antenna. In other words, the UL signal can be directed sent from the integrated device antenna to the integrated UL node antenna. The direct coupling between the integrated device antenna and the integrated UL node antenna can be achieved using a directional coupler.

Alternatively, the integrated device antenna can be coupled with the integrated UL node antenna using a splitter, a circulator, a triplexer, a quadplexer, a multiplexer, or a duplexer.

In one example, the integrated device antenna can receive an UL signal from a wireless device. Signal detectors can detect a power level of the UL signal. When the power level is above the defined threshold, one or more directional couplers can be configured such that the UL signal passes directly to the integrated UL node antenna via the simultaneous bypass path. As a result, the UL signal can avoid passing through the high band UL signal amplification path or the low band UL signal amplification path. The integrated UL node antenna can transmit the unamplified UL signal to a base station.

On the other hand, when the signal detectors detect that the power level of the UL signal is less than the defined threshold, the one or more directional couplers can be configured such that the UL signal is directed to a first diplexer. The first diplexer can direct the UL signal to either the high band UL signal amplification path or the low band UL signal amplification path, which causes the UL signal to be filtered and amplified. The UL signal can pass through a second diplexer, and then to the integrated UL node antenna for transmission to the base station. In this example, based on the power level of the UL signal, the UL signal does not travel through the simultaneous bypass path.

In one example, a DL signal can be received via the integrated DL node antenna. The DL signal can be directed to a third diplexer. The DL signal can be directed to a high band DL signal amplification path or a low band DL signal amplification path, and then to a fourth diplexer. The DL signal can travel from the fourth diplexer to the integrated device antenna for transmission to the wireless device.

In one example, the simultaneous bypass path can increase battery life of the cellular signal amplifier by allowing UL amplification to be turned off. Further, the simultaneous bypass path can increase reliability in the event the cellular signal amplifier malfunctions. In one example, the simultaneous bypass path can be always active. The simultaneous bypass path can operate independently of whether or not the cellular signal amplifier has failed. The simultaneous bypass path can operate independent of relays or switches to bypass the cellular signal amplifier. Additionally, because wireless propagation paths of signals from multiple antennas can constantly vary, fading margins can exceed 15 dB. Therefore, by using multiple antennas, the reliability of the cellular signal amplifier can be increased.

Figure 7:
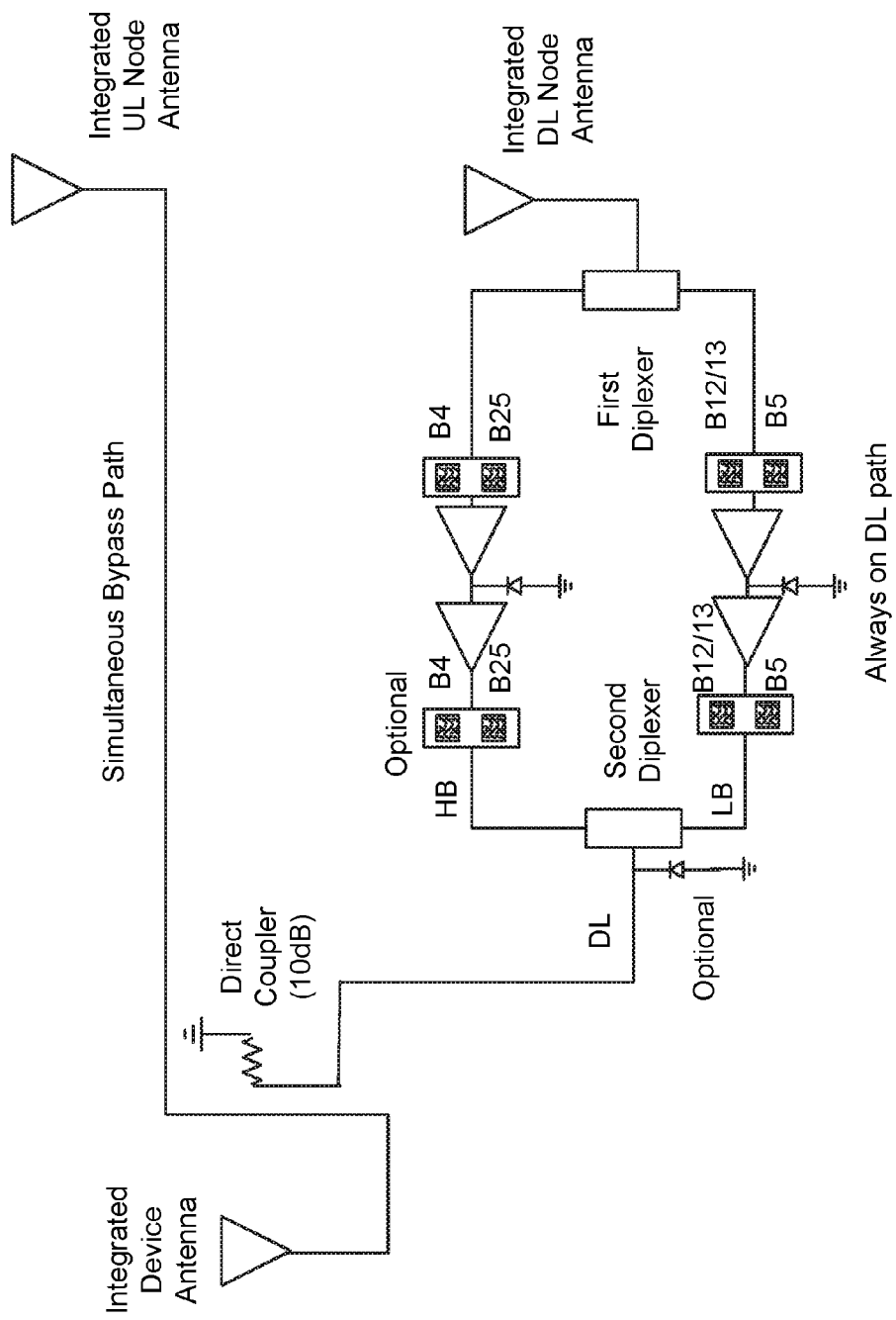
FIG. 7 illustrates a cellular signal amplifier configured with a simultaneous bypass path in accordance with an example.

FIG. 7 illustrates an exemplary cellular signal amplifier configured with a simultaneous bypass path. The cellular signal amplifier can only amplify downlink (DL) signals. The cellular signal amplifier can direct an uplink (UL) signal on a simultaneous bypass path, which enables the UL signal to travel directly from an integrated device antenna to an integrated UL node antenna. In other words, the UL signal can avoid a filtering and amplification path. In this case, when the UL signal is not amplified, the integrated device antenna can be directly coupled to the integrated UL node antenna. The direct coupling between the integrated device antenna and the integrated UL node antenna can be achieved using a directional coupler. The amplification of the UL signal can account for signal loss due to the directional coupler. In addition, by not amplifying the UL signal, a lower specific absorption rate (SAR) level can be achieved.

In one example, a DL signal can be received via an integrated DL node antenna. The DL signal can be directed to a first diplexer. The DL signal can be directed to a high band DL signal amplification path or a low band DL signal amplification path, and then to a second diplexer. The DL signal can travel from the second diplexer to the integrated device antenna for transmission to a wireless device.

In one configuration, the cellular signal amplifier can receive DL signals and transmit UL signals with a single integrated node antenna. In other words, the integrated UL node antenna and the integrated DL node antenna can be combined to form the single integrated node antenna.

In one configuration, the cellular signal amplifier can include the integrated device antenna and an integrated UL/DL node antenna. The integrated device antenna and the integrated UL/DL node antenna can be connected via a simultaneous bypass path, which bypasses the amplification and signaling paths. As an example, an UL signal from the integrated device antenna can be passed to the integrated UL/DL node antenna via the simultaneous bypass path. As another example, a DL signal from the integrated UL/DL node antenna can be passed to the integrated device antenna via the simultaneous bypass path.

In one example, the FCC can limit the cellular signal amplifier to a less than 9 dB system gain because the cellular signal amplifier does not perform UL amplification. In another example, the cellular signal amplifier can include a detector that can detect an UL signal, and then determine whether to turn the DL amplification path on or off. In yet another example, the cellular signal amplifier can include an additional low noise amplifier (LNA) to reduce the noise figure.

Figure 8:
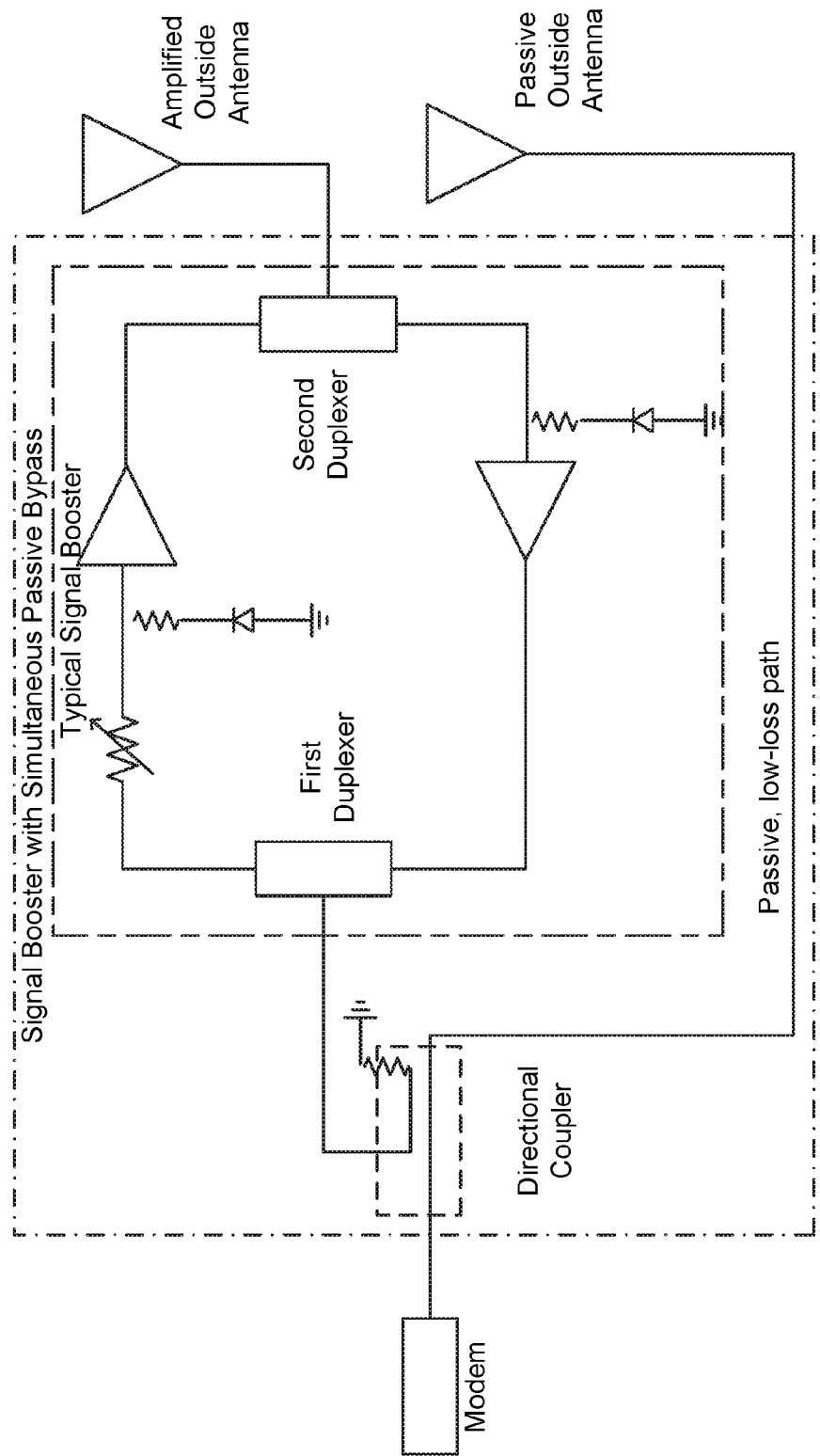
FIG. 8 illustrates a cellular signal amplifier with an amplified outside antenna and a simultaneous bypass path to a passive outside antenna in accordance with an example.

FIG. 8 illustrates an exemplary cellular signal amplifier with an amplified outside antenna and a simultaneous bypass path to a passive outside antenna. A modem (or inside antenna) can be coupled to the cellular signal amplifier for communication of amplified signals through the amplified outside antenna. The cellular signal amplifier can improve modem sensitivity, improve UL output power of the modem and improve overall performance of the modem. The modem can be coupled to the cellular signal amplifier when a power level of uplink (UL) or downlink (DL) signals is below a defined threshold. In addition, the modem can be coupled to the passive antenna for communication of non-amplified signals. These different signal paths can provide the cellular signal amplifier with signal diversity. In one example, the modem (or inside antenna) can be coupled to the cellular signal amplifier using a directional coupler.

In one example, the modem can direct an UL signal to the passive outside antenna via a passive, low-loss path, and the UL signal can be transmitted using the passive outside antenna. The directional coupler can enable the UL signal to travel to the passive, low-loss path. The modem can directly send the UL signal to the passive outside antenna when a power level of the UL signal is above a defined threshold (i.e., the UL signal does not need amplification). Alternatively, the modem can direct the UL signal to a first duplexer. The modem can direct the UL signal to the first duplexer when the power level of the UL signal is below the defined threshold (i.e., the UL signal needs to be amplified). The first duplexer can direct to the UL signal through an amplifier and then to a second duplexer, which can direct the UL signal to the amplified outside antenna.

In one example, the amplified outside antenna can receive a DL signal. The DL signal can be directed to the second duplexer, which can direct the DL signal to an amplifier and then to the first duplexer. The first duplexer can direct the DL signal to the modem (or inside antenna).

In one configuration, the cellular signal amplifier can include circulators, triplexers, quadplexers, multiplexers, or splitters instead of the duplexers.

In one example, the directional coupler can cause a 6 dB gain loss in the signals transmitted across the directional coupler. However, the gain loss can be compensated with an increased gain from the cellular signal amplifier. In addition, the directional coupler can add some loss to the passive, low-loss path, but the loss can be minimized by an increased coupling factor.

Figure 9:
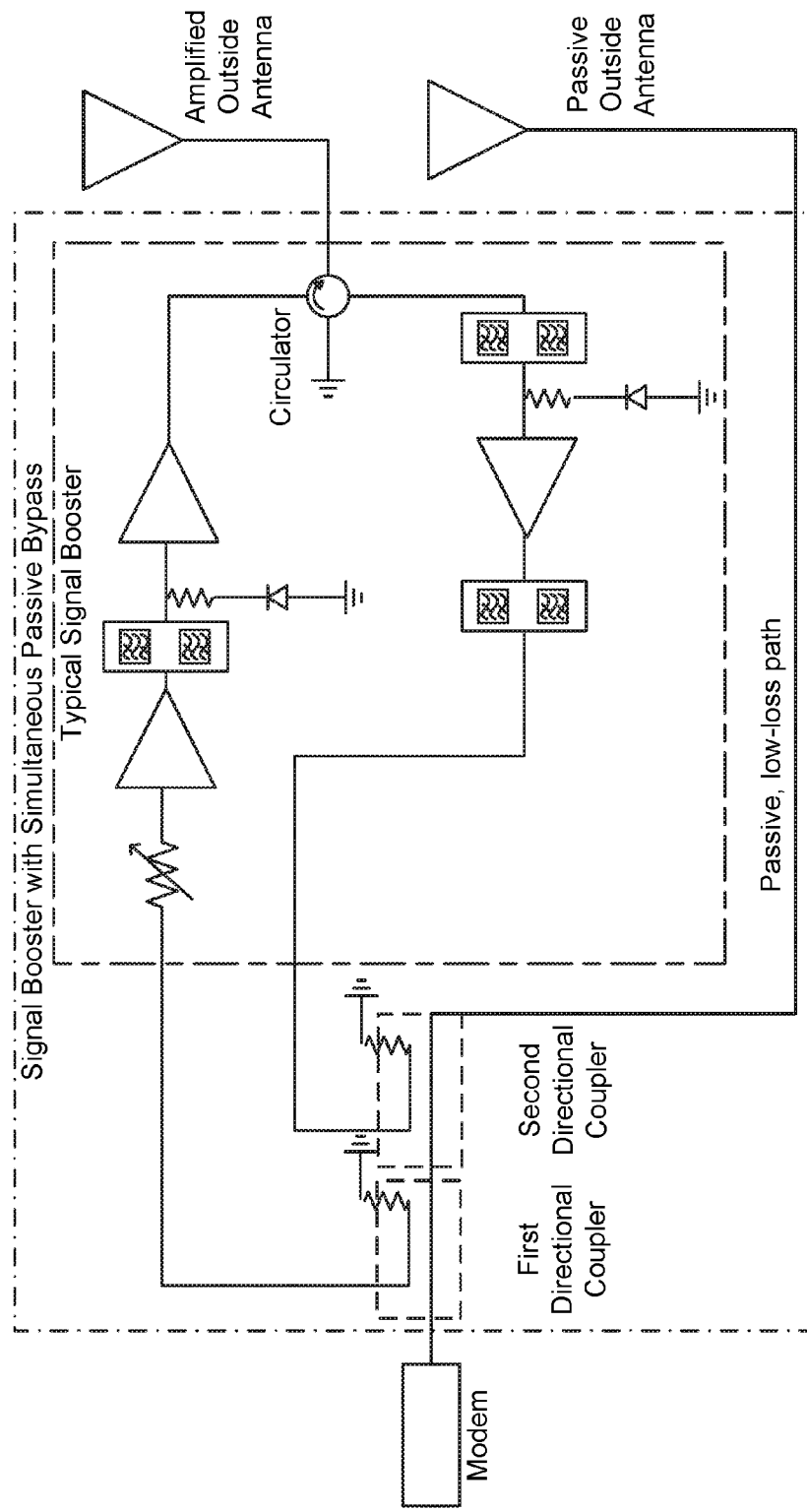
FIG. 9 illustrates a cellular signal amplifier with a simultaneous bypass path with independent coupling for each of an amplified outside antenna and a passive outside antenna in accordance with an example.

FIG. 9 illustrates an exemplary cellular signal amplifier with a simultaneous bypass path with independent coupling for each of an amplified outside antenna and a passive outside antenna. The independent coupling can be achieved with a separate directional coupler for each antenna. In other words, a first directional coupler can be used with the amplified outside antenna, and a second directional coupler can be used with the passive outside antenna. The separate directional couplers can yield higher uplink (UL) to down-link (DL) signal isolation as compared to using splitters.

In one example, a modem (or inside antenna) can direct an UL signal to the passive outside antenna via a passive, low-loss path, and the UL signal can be transmitted using the passive outside antenna. The first directional coupler can enable the UL signal to travel to the passive, low-loss path. The modem can directly send the UL signal to the passive outside antenna when a power level of the UL signal is above a defined threshold (i.e., the UL signal does not need amplification). Alternatively, the modem can direct the UL signal to an UL amplification and filtering path. The modem can direct the UL signal to the UL amplification and filtering path duplexer when the power level of the UL signal is below the defined threshold (i.e., the UL signal needs to be amplified). The first first coupler can enable the UL signal to travel to the UL amplification and filtering path. The UL signal can be directed via a circulator to the amplified outside antenna, which can direct the UL signal to a base station.

In one example, the amplified outside antenna can receive a DL signal. The DL signal can be directed to the circulator, which can direct the DL signal to a DL amplification and filtering path. Then, the DL signal can be directed to the modem via the second directional coupler.

In one example, the amplified and non-amplified signals can be broadcast via a single antenna. In other words, a single antenna can be used in place of the amplified outside antenna and the passive outside antenna. In another example, separate antennas can be used for UL and DL on the front end to avoid duplexer or front end losses, which can increase UL output power and DL sensitivity. However, with this example, there can be potential for collisions/interference due to simultaneous signals on the same frequency on the UL and/or DL paths. However, the collisions/interference can be mitigated by signal level adjustments or delays. These adjustments can be detected and controlled using, for example, the modem.

Figure 10:
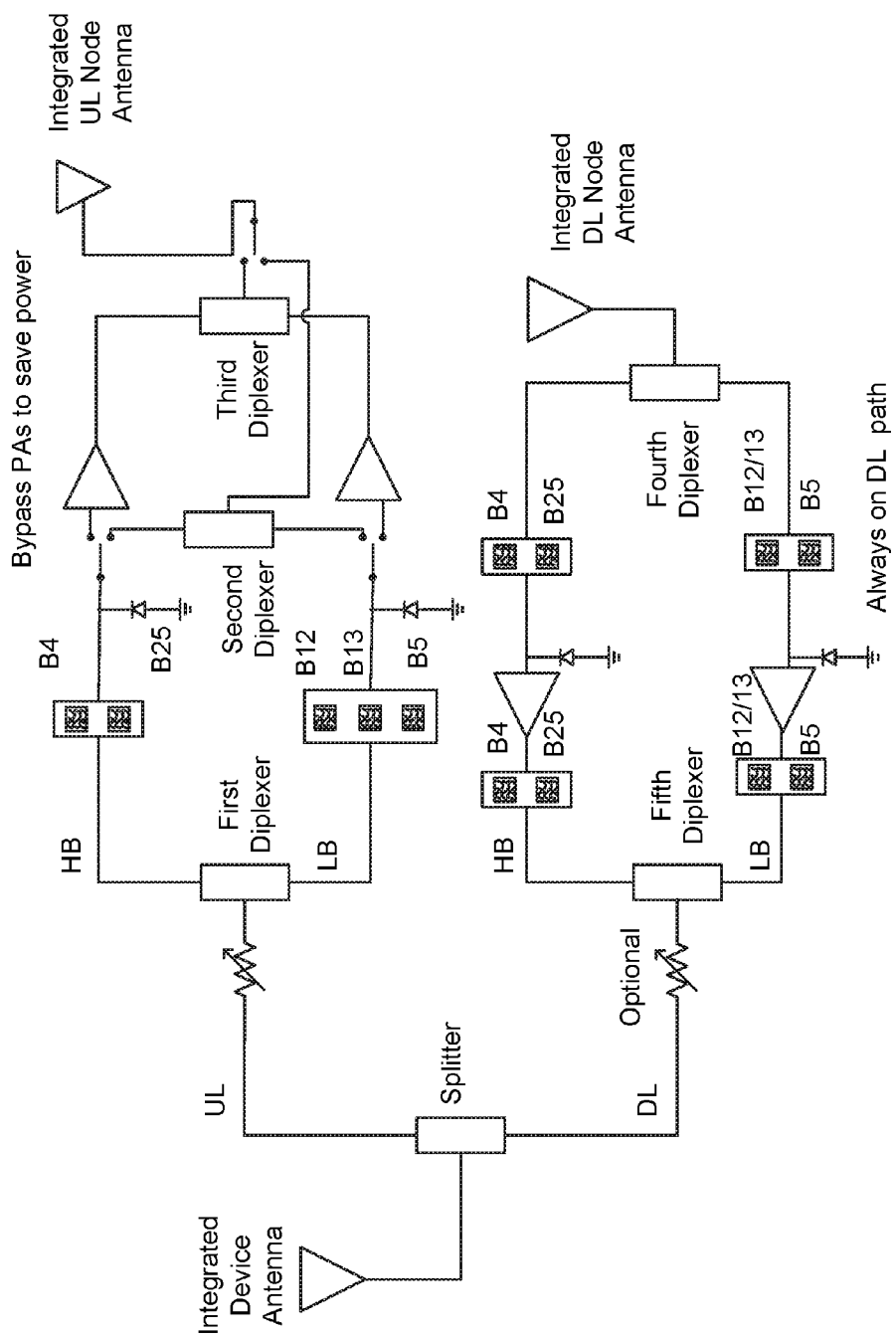
FIG. 10 illustrates a cellular signal amplifier with bypassable power amplifiers in accordance with an example.

FIG. 10 illustrates an exemplary cellular signal amplifier with bypassable power amplifiers. An integrated device antenna can receive an uplink (UL) signal, which can be directed to a splitter, and then to a first diplexer. The first diplexer can direct the UL signal to a high band UL path or a low band UL path. The high band UL path and the low band UL path can each include a bypassable power amplifier. In one example, when the bypassable power amplifiers are switched off (e.g., to save power), the UL signal from the high band UL path or the low band UL path can travel to a second diplexer, then to a third diplexer, and then to an integrated UL node antenna. In this example, the UL signal is not amplified to save power. In addition, the high band UL path and the low band UL path can each include a signal detector, which can detect a power level of the UL signal. When the power level of the UL signal is above a defined threshold, the UL signal may not be amplified.

In another example, when the bypassable power amplifiers are switched on, the UL signal from the high band UL path or the low band UL path can be directed to a respective power amplifier, and then to the third diplexer. The UL signal can travel from the third diplexer to the integrated UL node antenna. In this example, the UL signal can be amplified prior to transmission from the integrated UL node antenna.

In one example, an integrated DL node antenna can direct a DL signal to a fourth diplexer. The fourth diplexer can direct the DL signal to a high band DL signal amplification and filtering path, or to a low band DL signal amplification and filtering path. A fifth diplexer can direct the DL signal to the splitter, which can direct the signal to the integrated device antenna.

Figure 11:
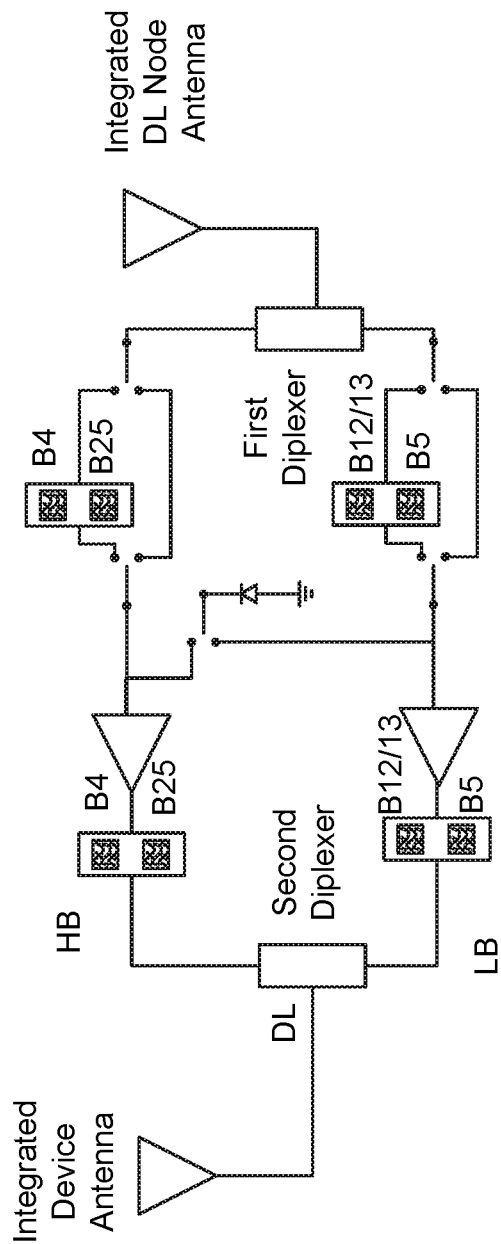
FIG. 11 illustrates a cellular signal amplifier configured with switchable band pass filters (BPFs) in accordance with an example.

FIG. 11 illustrates an exemplary cellular signal amplifier configured with switchable band pass filters (BPFs). Front end BPFs can be switched in when a weak downlink (DL) DL signal is detected or switched out when a strong DL signal is detected. An example of a weak DL signal can be a signal with a signal strength less than −80 dBm while a strong DL signal can be a signal with a signal strength greater than −80 dBm. The minimization of noise figure can be critical in weak signal areas, and the noise figure can be reduced and the coverage extended when the front-end BPFs are switched off. In addition, the switchable BPFs can function to extend a receive sensitivity of the cellular signal amplifier.

In one example, an integrated DL node antenna can receive a DL signal, and the DL signal can be provided to a first diplexer. The first diplexer can direct the DL signal to a high band signal amplification and filtering path, or the DL signal can be directed to a low band signal amplification and filtering path. The high band path and the low band path can each include switchable BPFs, which enable the DL signal to avoid passing through at least some of the BPFs. The DL signal can be directed to a second diplexer, and then to an integrated device antenna.

Figure 12:
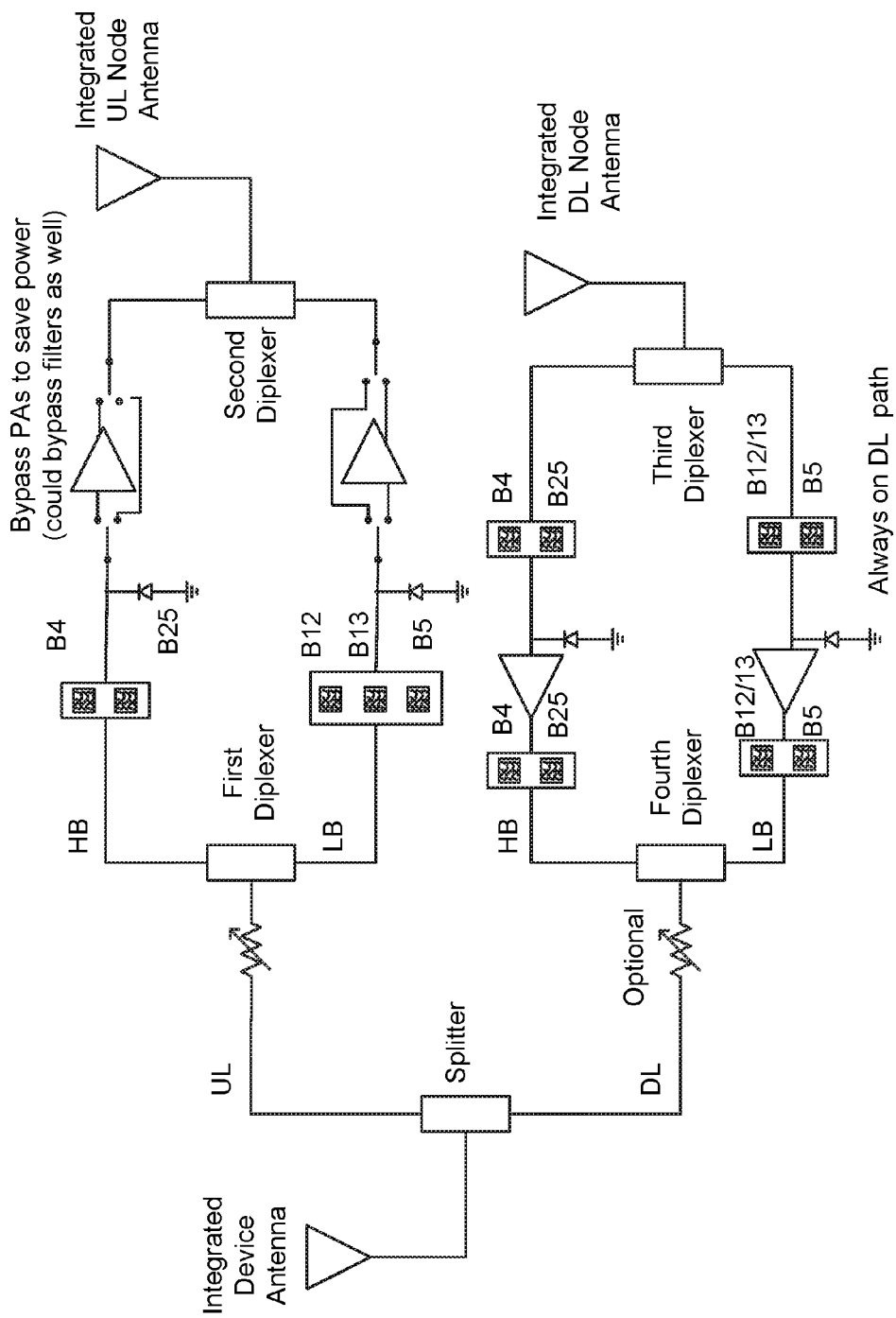
FIG. 12 illustrates a cellular signal amplifier with bypassable power amplifiers in accordance with an example.

FIG. 12 illustrates an exemplary cellular signal amplifier with bypassable power amplifiers. The power amplifiers can be switched on when an uplink (UL) signal needs to be amplified to reach a base station or switched off and bypassed when a UL signal does not need to be amplified to reach a base station. In one example, the power amplifiers can be switched on when a power level of the UL signal is below a defined threshold, and the power amplifiers can be switched off when the power level of the UL signal is above the defined threshold.

In one example, an integrated device antenna can receive an UL signal. The UL signal can be directed to a splitter, and then to a first diplexer. The first diplexer can direct the UL signal to a high band signal amplification and filtering path or a low band signal amplification and filtering path. Each of the high band and low band paths can include a switchable power amplifier. Depending on the power level of the UL signal in relation to the defined threshold, the UL signal can be provided to the power amplifier or bypass the power amplifier to save power. The UL signal can be provided to a second diplexer, and then to an integrated UL node antenna.

In one example, an integrated DL node antenna can direct a DL signal to a third diplexer. The third diplexer can direct the DL signal to a high band DL signal amplification and filtering path, or to a low band DL signal amplification and filtering path. A fourth diplexer can direct the DL signal to the splitter, which can direct the signal to the integrated device antenna.

Figure 13:
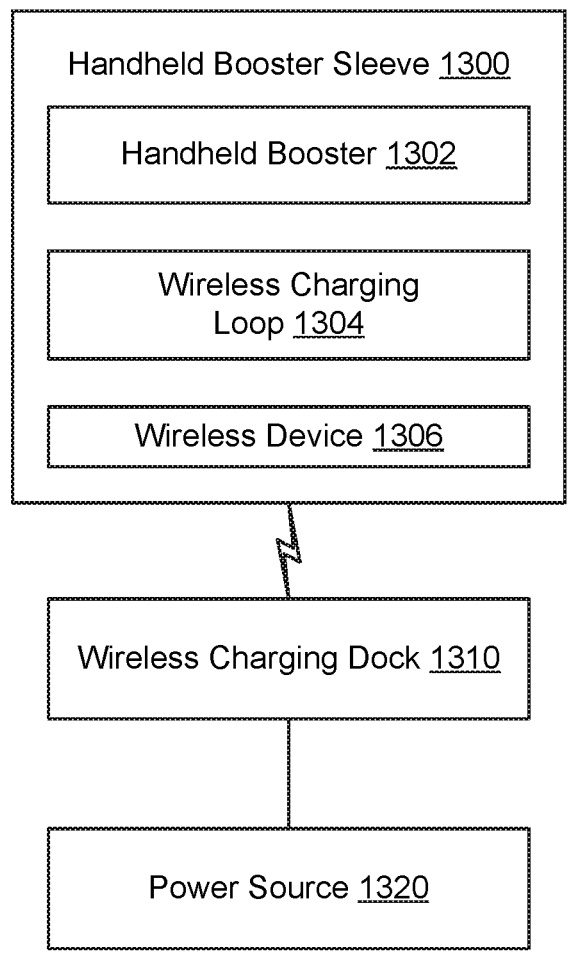
FIG. 13 illustrates a handheld booster sleeve configured to wirelessly charge a wireless device located within the handheld booster sleeve in accordance with an example.

FIG. 13 illustrates an example of a handheld booster sleeve 1300 configured to wirelessly charge a wireless device 1306 located within the handheld booster sleeve 1300. The handheld booster sleeve 1300 can hold a handheld booster 1302. The handheld booster sleeve 1300 can include a wireless charging loop 1304 and integrated circuitry to enable wireless charging in the handheld booster sleeve 1300. Alternatively, the wireless charging loop 1304 can be integrated with the handheld booster 1302. By placing the wireless device 1306 with the handheld booster 1302 within the handheld booster sleeve 1300, and placing the handheld booster sleeve 1300 in proximity to a wireless charging dock 1310, the wireless device 1306 (and battery) can wirelessly charge. The wireless charging dock 1310 can be connected to a power source 1320, such as a wall outlet. This feature can enable wireless devices that are not configured for wireless charging to be wireless charged.

In one example, a cellular signal booster can be configured for wireless charging. For example, a cellular signal booster can be configured with a wireless charging dock, such that a wireless charging-enabled wireless device can be charged. Examples of the cellular signal boosters that can perform wireless charging include signal boosters found in homes, offices, and in vehicles.

Figure 14:
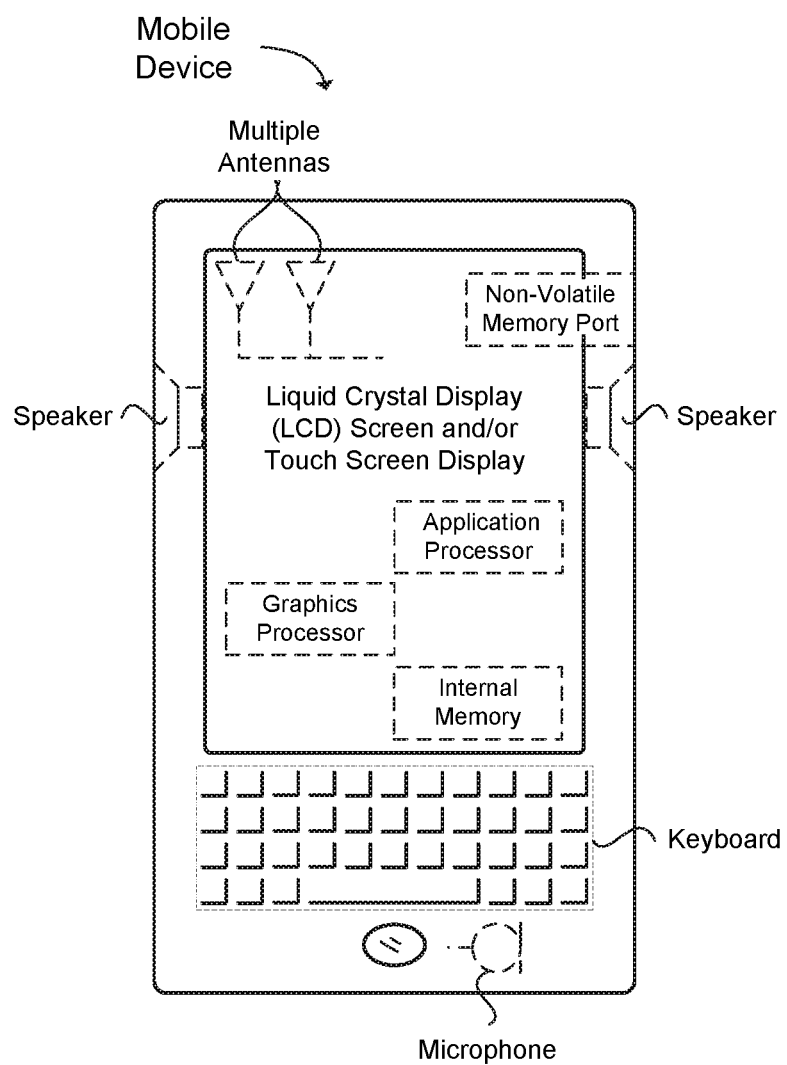
FIG. 14 illustrates a wireless device in accordance with an example.

FIG. 14 provides an example illustration of the wireless device, such as a user equipment (UE), a mobile station (MS), a mobile communication device, a tablet, a handset, a wireless transceiver coupled to a processor, or other type of wireless device. The wireless device can include one or more antennas configured to communicate with a node or transmission station, such as an access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 14 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be with the wireless device or wirelessly connected to the wireless device to provide additional user input. A virtual keyboard can also be provided using the touch screen.

Examples

The following examples pertain to specific technology embodiments and point out specific features, elements, or actions that can be used or otherwise combined in achieving such embodiments.

Example 1 includes a wireless device signal amplifier sleeve, comprising: a housing that encloses at least a portion of a wireless device; a cellular signal amplifier integrated with the wireless device signal amplifier sleeve, wherein the cellular signal amplifier is configured to amplify signals for the wireless device; and a battery integrated with the wireless device signal amplifier sleeve, wherein the battery is configured to provide power to the cellular signal amplifier and the wireless device.

Example 2 includes the wireless device signal amplifier sleeve of Example 1, further comprising an integrated device antenna coupled to the cellular signal amplifier, wherein the integrated device antenna is configured to transmit signals from the cellular signal amplifier to the wireless device, wherein the signals are detected at the wireless device via a wireless device antenna.

Example 3 includes the wireless device signal amplifier sleeve of any of Examples 1 to 2, wherein a spacing between the integrated device antenna and the wireless device antenna within the wireless device signal amplifier sleeve is increased to achieve an increased coupling loss.

Example 4 includes the wireless device signal amplifier sleeve of any of Examples 1 to 3, wherein a primary antenna of the wireless device is coupled to the wireless device antenna within the wireless device signal amplifier sleeve at a predetermined distance to enable simultaneous uplink and downlink signal transmission at the wireless device, wherein the primary antenna of the wireless device is blocked by the wireless device to enable communications using a second antenna of the wireless device, wherein the second antenna of the wireless device is configured to communicate with a base station when a node antenna within the wireless device signal amplifier sleeve communicates with the base station.

Example 5 includes the wireless device signal amplifier sleeve of any of Examples 1 to 4, further comprising wireless charging circuitry operable to wirelessly charge the battery when the wireless device signal amplifier sleeve is placed in proximity to a wireless charging dock.

Example 6 includes the wireless device signal amplifier sleeve of any of Examples 1 to 5, wherein a portion of the wireless device is wrapped in at least one of a radio frequency (RF) absorbent material or a reflective material to reduce a specific absorption rate (SAR) level caused by the cellular signal amplifier integrated with the wireless device signal amplifier sleeve.

Example 7 includes the wireless device signal amplifier sleeve of any of Examples 1 to 6, further comprising a node antenna that enables the wireless device signal amplifier sleeve to communicate with one or more wireless device signal amplifier sleeves using one or more of Bluetooth v4.0, Bluetooth Low Energy, Bluetooth v4.1, Bluetooth v4.2, Ultra High Frequency (UHF), Very High Frequency (VHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, and a TV White Space Band (TVWS).

Example 8 includes the wireless device signal amplifier sleeve of any of Examples 1 to 7, further comprising: a cellular signal filter coupled to the cellular signal amplifier and configured to filter signals for a base station; a satellite signal filter coupled to the cellular signal amplifier and configured to filter signals for a satellite; and a node antenna disposed within the sleeve, communicatively coupled to the cellular signal amplifier and configured to communicate with the satellite and the base station.

Example 9 includes the wireless device signal amplifier sleeve of any of Examples 1 to 8, wherein the cellular signal amplifier is further configured to: receive a downlink signal from a base station; direct the downlink signal to a selected signal path for filtering and amplification of the downlink signal, wherein the signal path is selected based on a band associated with the downlink signal; and transmit an amplified downlink signal to the wireless device.

Example 10 includes the wireless device signal amplifier sleeve of any of Examples 1 to 9, wherein the cellular signal amplifier is further configured to: receive an uplink signal from the wireless device; direct the uplink signal to a selected signal path for filtering and amplification of the uplink signal, wherein the signal path is selected based on a band associated with the uplink signal; and transmit an amplified uplink signal to a base station.

Example 11 includes the wireless device signal amplifier sleeve of any of Examples 1 to 10, wherein the cellular wireless device is removable from the wireless device signal amplifier sleeve.

Example 12 includes the wireless device signal amplifier sleeve of any of Examples 1 to 11, wherein the cellular signal amplifier is a Federal Communications Commission (FCC)-compatible consumer signal booster.

Example 13 includes the wireless device signal amplifier sleeve of any of Examples 1 to 12, wherein the housing is sized and shaped to enclose at least the portion of the wireless device.

Example 14 includes the wireless device signal amplifier sleeve of any of Examples 1 to 13, wherein the cellular signal amplifier is configured to boost signals in up to six bands.

Example 15 includes a wireless device signal amplifier sleeve, comprising: a housing that encloses at least a portion of a wireless device, wherein the wireless device includes a primary antenna and a secondary antenna; a cellular signal amplifier integrated with the wireless device signal amplifier sleeve, wherein the cellular signal amplifier is configured to amplify signals to or from a base station for the wireless device; an integrated device antenna coupled to the cellular signal amplifier, wherein the integrated device antenna is coupled to the primary antenna of the wireless device at a selected distance, wherein the secondary antenna of the wireless device enables the wireless device to directly communicate with the base station; and an integrated node antenna coupled to the cellular signal amplifier, wherein the integrated node antenna is configured to transmit signals from the cellular signal amplifier to a base station.

Example 16 includes the wireless device signal amplifier sleeve of Example 15, further comprising a battery integrated with the wireless device signal amplifier sleeve, wherein the battery is configured to provide power to the cellular signal amplifier and the wireless device.

Example 17 includes the wireless device signal amplifier sleeve of any of Examples 15 to 16, wherein the integrated device antenna is coupled to the primary antenna of the wireless device at the selected distance to achieve a desired coupling factor.

Example 18 includes the wireless device signal amplifier sleeve of any of Examples 15 to 17, wherein communication between the primary antenna of the wireless device and the integrated device antenna coupled to the cellular signal amplifier is operable to occur simultaneously as communication between the secondary antenna of the wireless device and the base station.

Example 19 includes a wireless device signal amplifier sleeve, comprising: a housing that encloses at least a portion of a wireless device; a cellular signal amplifier integrated with the wireless device signal amplifier sleeve, wherein the cellular signal amplifier is configured to amplify signals for the wireless device; an integrated device antenna coupled to the cellular signal amplifier, wherein the integrated device antenna is configured to transmit signals from the cellular signal amplifier to the wireless device; an integrated node antenna coupled to the cellular signal amplifier, wherein the integrated node antenna is configured to transmit signals from the cellular signal amplifier to a base station; and a battery integrated with the wireless device signal amplifier sleeve, wherein the battery is configured to provide power to the cellular signal amplifier and the wireless device.

Example 20 includes the wireless device signal amplifier sleeve of Example 19, further comprising wireless charging circuitry operable to wirelessly charge the battery when the wireless device signal amplifier sleeve is placed in proximity to a wireless charging dock.

Example 21 includes the wireless device signal amplifier sleeve of any of Examples 19 to 20, wherein the cellular wireless device is removable from the wireless device signal amplifier sleeve.

Example 22 includes the wireless device signal amplifier sleeve of any of Examples 19 to 21, wherein a spacing between the integrated device antenna and the wireless device antenna within the wireless device signal amplifier sleeve is increased to achieve an increased coupling loss.

Example 23 includes a signal repeater, comprising: a first antenna configured to communicate signals with a wireless device; a second antenna configured to communicate signals with a base station; one or more amplification and filtering signal paths configured to be positioned between the first antenna and the second antenna, wherein the amplification and filtering signal paths are configured to amplify and filter signals for communication to the base station via the first antenna or for communication to the wireless device via the second antenna; and a bypass signal path configured to be positioned between the first antenna and the second antenna, wherein the bypass signal path does not amplify and filter signals traveling through the bypass signal path, wherein signals are directed to one of the amplification and filtering signal paths or the bypass signal path.

Example 24 includes the signal repeater of Example 23, wherein the first antenna includes an integrated device antenna and the second antenna includes an integrated node antenna.

Example 25 includes the signal repeater of any of Examples 23 to 24, wherein the signals are directed to one of the amplification and filtering signal paths or the bypass signal path depending on a power level of the signals in relation to a defined power level threshold.

Example 26 includes the signal repeater of any of Examples 23 to 25, further comprising one or more detectors configured to detect the power levels of the signals.

Example 27 includes the signal repeater of any of Examples 23 to 26, further comprising one or more directional couplers used to form the amplification and filtering signal paths and the bypass signal path.

Example 28 includes the signal repeater of any of Examples 23 to 27, wherein: signals are directed to one of the amplification and filtering signal paths when power levels of the signals are below the defined power level threshold; and signals are directed to the bypass signal path when power levels of the signals are above the defined power level threshold.

Example 29 includes the signal repeater of any of Examples 23 to 28, wherein the amplification and filtering signal paths includes a high band amplification and filtering signal path operable to direct signals within high frequency bands.

Example 30 includes the signal repeater of any of Examples 23 to 29, wherein the amplification and filtering signal paths includes a low band amplification and filtering signal path operable to direct signals within low frequency bands.

Example 31 includes the signal repeater of any of Examples 23 to 30, wherein the first antenna includes an integrated uplink (UL) node antenna or an integrated downlink (DL) node antenna.

Example 32 includes the signal repeater of any of Examples 23 to 31, wherein the amplification and filtering signal paths are configured to boost signals in up to six bands.

Example 33 includes the signal repeater of any of Examples 23 to 32, wherein the signal repeater is insertable in a wireless device signal amplifier sleeve along with the wireless device.

Example 34 includes a signal repeater, comprising: a first antenna configured to communicate signals with a wireless device; a second antenna configured to communicate signals with a base station; and a signal amplifier configured to amplify and filter signals for communication to the base station via the first antenna or for communication to the wireless device via the second antenna, wherein the first antenna is configured to be coupled to the second antenna to form a bypass signal path that bypasses the signal amplifier.

Example 35 includes the signal repeater of Example 34, further comprising one or more detectors configured to detect the power levels of the signals.

Example 36 includes the signal repeater of any of Examples 34 to 35, wherein signals are directed to the bypass signal path when the power levels of the signals are above a defined power level threshold.

Example 37 includes the signal repeater of any of Examples 34 to 36, wherein signals are not directed to the bypass signal path when the power levels of the signals are below a defined power level threshold.

Example 38 includes the signal repeater of any of Examples 34 to 37, further comprising one or more directional couplers used to form the bypass signal path that bypasses the signal amplifier.

Example 39 includes the signal repeater of any of Examples 34 to 38, wherein the first antenna includes an integrated uplink (UL) node antenna or an integrated downlink (DL) node antenna.

Example 40 includes the signal repeater of any of Examples 34 to 39, wherein the signal amplifier includes one or more downlink (DL) amplification and filtering signal paths and one or more uplink (UL) amplification and filtering signal paths.

Example 41 includes the signal repeater of any of Examples 34 to 40, wherein the signal amplifier includes one or more amplifiers and one or more band pass filters, wherein the band pass filters correspond to high frequency bands or low frequency bands.

Example 42 includes a signal repeater, comprising: a network hardware device configured to communicate signals with a wireless device; an amplified node antenna configured to communicate signals with a base station; a passive node antenna configured to communicate signals with the base station; one or more amplification and filtering signal paths configured to be positioned between the network hardware device and the amplified node antenna, wherein the amplification and filtering signal paths are configured to amplify and filter signals for communication to the base station via the amplified node antenna or for communication to the wireless device via the network hardware device; and a bypass signal path configured to be positioned between the network hardware device and the passive node antenna, wherein the bypass signal path does not amplify and filter signals traveling through the bypass signal path.

Example 43 includes the signal repeater of Example 42, further comprising one or more detectors configured to detect power levels of signals from the network hardware device, wherein the signals are provided to one of the amplification and filtering signal paths when the power levels of the signals are below a defined power level threshold or the signals are provided to bypass signal path when the power levels of the signals are above the defined power level threshold.

Example 44 includes the signal repeater of any of Examples 42 to 43, further comprising one or more directional couplers used to form the amplification and filtering signal paths and the bypass signal path.

Example 45 includes the signal repeater of any of Examples 42 to 44, wherein the signal repeater is insertable in a wireless device signal amplifier sleeve along with the wireless device.

Example 46 includes the signal repeater of any of Examples 42 to 45, wherein the network hardware device includes a modem.

Example 47 includes a signal booster, comprising: a signal amplifier that includes one or more amplification and filtering signal paths, wherein the amplification and filtering signal paths are configured to amplify and filter signals; and one or more detectors configured to detect power levels of the signals, wherein the one or more amplification and filtering signal paths include one or more bypassable amplifiers, wherein the signals bypass the amplifiers to conserve energy based on the power levels of the signals in relation to a defined power level threshold, and the signals do not bypass the amplifiers based on the power levels of the signals in relation to the defined power level threshold.

Example 48 includes the signal booster of Example 47, further comprising: an integrated device antenna configured to communicate signals with a wireless device; and an integrated node antenna configured to communicate signals with a base station.

Example 49 includes the signal booster of any of Examples 47 to 48, wherein the integrated node antenna includes an integrated uplink (UL) node antenna or an integrated downlink (DL) node antenna.

Example 50 includes the signal booster of any of Examples 47 to 49, wherein the one or more amplification and filtering signal paths include one or more downlink (DL) amplification and filtering signal paths and one or more uplink (UL) amplification and filtering signal paths.

Example 51 includes the signal booster of any of Examples 47 to 50, wherein the signal booster is insertable in a wireless device signal amplifier sleeve along with the wireless device.

Example 52 includes the signal booster of any of Examples 47 to 51, wherein the signal booster is a Federal Communications Commission (FCC)-compatible consumer signal booster.

Example 53 includes the signal booster of any of Examples 47 to 52, wherein the signal amplifier is configured to boost signals in up to six bands.

Example 54 includes a signal booster, comprising: a signal amplifier that includes one or more amplification and filtering signal paths, wherein the amplification and filtering signal paths are configured to amplify and filter signals; and one or more detectors configured to detect power levels of the signals, wherein the one or more amplification and filtering signal paths include one or more switchable band pass filters, wherein the band pass filters are switched in based on the power levels of the signals in relation to a defined power level threshold, the band pass filters are switched out based on the power levels of the signals in relation to the defined power level threshold.

Example 55 includes the signal booster of Example 54, further comprising: an integrated device antenna configured to communicate signals with a wireless device; and an integrated node antenna configured to communicate signals with a base station.

Example 56 includes the signal booster of any of Examples 54 to 55, wherein the band pass filters are switched out to reduce a noise figure of the signal booster and extend a coverage area of the signal booster.

Example 57 includes the signal booster of any of Examples 54 to 56, wherein the switchable band pass filters correspond to high frequency bands or low frequency bands, wherein the high frequency bands include band 4 (B4) and band 25 (B25), and the low frequency bands include band 5 (B5), band 12 (B12) and band 13 (B13).

Example 58 includes the signal booster of any of Examples 54 to 57, wherein the switchable band pass filters are first band pass filters in a defined stage of the amplification and filtering signal paths.

Example 59 includes the signal booster of any of Examples 54 to 58, wherein the signal booster is insertable in a wireless device signal amplifier sleeve along with the wireless device.

Example 60 includes the signal booster of any of Examples 54 to 59, wherein the signal booster is a Federal Communications Commission (FCC)-compatible consumer signal booster.

Example 61 includes a signal booster, comprising: a signal amplifier configured to amplify and filter signals for a wireless device; and one or more detectors configured to detect power levels of the signals, wherein the signal amplifier includes at least one of: one or more bypassable amplifiers or one or more switchable band pass filters that are configurable depending on detected power levels of the signals.

Example 62 includes the signal booster of Example 61, wherein: the signals bypass the amplifiers to conserve energy based on the power levels of the signals in relation to a defined power level threshold; or the signals do not bypass the amplifiers based on the power levels in relation to the defined power level threshold.

Example 63 includes the signal booster of any of Examples 61 to 62, wherein: the band pass filters are switched in based on the power levels of the signals in relation to a defined power level threshold; or the band pass filters are switched out based on the power levels of the signals in relation to the defined power level threshold.

Example 64 includes the signal booster of any of Examples 61 to 63, wherein the signal amplifier is further configured to: receive a downlink signal from a base station; direct the downlink signal to a selected signal path for filtering and amplification of the downlink signal, wherein the signal path is selected based on a band associated with the downlink signal; and transmit an amplified downlink signal to the wireless device.

Example 65 includes the signal booster of any of Examples 61 to 64, wherein the signal amplifier is further configured to: receive an uplink signal from the wireless device; direct the uplink signal to a selected signal path for filtering and amplification of the uplink signal, wherein the signal path is selected based on a band associated with the uplink signal; and transmit an amplified uplink signal to a base station.

Example 66 includes the signal booster of any of Examples 61 to 65, wherein the signal booster is a cellular signal booster.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A signal booster, comprising:
   a signal amplifier that includes one or more amplification and filtering signal paths, wherein the amplification and filtering signal paths are configured to amplify and filter one or more signals; and
   one or more detectors configured to detect a power level of the one or more signals prior to a bypassable amplifier and a switchable multi-band pass filter;
   an amplifier bypass path to enable the one or more signals to be directed from the one or more amplification and filtering signal paths to the amplifier bypass path to bypass the bypassable amplifier based on the power level of the one or more signals in relation to a defined power level threshold; and
   a band pass filter bypass path to enable the one or more signals to be directed from the one or more amplification and filtering signal paths to the band pass filter bypass path to:
   bypass the switchable multi-band pass filter when the power level of the one or more signals is less than the defined power level threshold; and
   not bypass the switchable multi-band pass filter when the power level of the one or more signals is greater than the defined power level threshold,
   wherein the switchable multi-band pass filter is configured to be bypassed prior to a first stage of a downlink (DL) path in the one or more amplification and filtering signal paths in a weak signal area to reduce a noise figure.

2. The signal booster of claim 1, further comprising:
   an integrated device antenna configured to communicate signals with a wireless device; and
   an integrated node antenna configured to communicate signals with a base station.

3. The signal booster of claim 2, wherein the integrated node antenna includes an integrated uplink (UL) node antenna or an integrated downlink (DL) node antenna.

4. The signal booster of claim 1, wherein the one or more amplification and filtering signal paths include one or more downlink (DL) amplification and filtering signal paths and one or more uplink (UL) amplification and filtering signal paths.

5. The signal booster of claim 1, wherein the signal booster is insertable in a wireless device signal amplifier sleeve along with the wireless device.

6. The signal booster of claim 1, wherein the signal booster is a Federal Communications Commission (FCC)-compatible consumer signal booster.

7. The signal booster of claim 1, wherein the signal amplifier is configured to boost signals in up to six bands.

8. The signal booster of claim 1, wherein the one or more signals are directed along the one or more amplification and filtering signal paths and avoid the amplifier bypass path based on the power level of the one or more signals in relation to the defined power level threshold.

9. The signal booster of claim 1, wherein the signals bypass the bypassable amplifier to conserve energy based on the power level of the one or more signals in relation to the defined power level threshold, and the one or more signals do not bypass the bypassable amplifier based on the power level of the one or more signals in relation to the defined power level threshold.

10. A signal booster, comprising:
    a signal amplifier that includes one or more amplification and filtering signal paths, wherein the amplification and filtering signal paths are configured to amplify and filter one or more signals; and
    one or more detectors configured to detect a power level of the one or more signals prior to a switchable multi-band pass filter; and
    a band pass filter bypass path to enable the one or more signals to be directed from the one or more amplification and filtering signal paths to the band pass filter bypass path to:
    bypass the switchable multi-band pass filter when the power level of the one or more signals is less than a defined power level threshold; and
    not bypass the switchable multi-band pass filter when the power level of the one or more signals is greater than the defined power level threshold,
    wherein the switchable multi-band pass filter is configured to be bypassed prior to a first stage of a downlink (DL) path in the one or more amplification and filtering signal paths in a weak signal area to reduce a noise figure.

11. The signal booster of claim 10, further comprising:
    an integrated device antenna configured to communicate signals with a wireless device; and
    an integrated node antenna configured to communicate signals with a base station.

12. The signal booster of claim 10, wherein the switchable multi-band pass filter corresponds to high frequency bands or low frequency bands, wherein the high frequency bands include band 4 (B4) and band 25 (B25), and the low frequency bands include band 5 (B5), band 12 (B12) and band 13 (B13).

13. The signal booster of claim 10, wherein the switchable multi-band pass filter is a first band pass filter in a defined stage of the amplification and filtering signal paths.

14. The signal booster of claim 10, wherein the signal booster is insertable in a wireless device signal amplifier sleeve along with the wireless device.

15. The signal booster of claim 10, wherein the signal booster is a Federal Communications Commission (FCC)-compatible consumer signal booster.

16. The signal booster of claim 10, wherein the one or more signals are directed along the one or more amplification and filtering signal paths and avoid the band pass filter bypass path based on the power level of the one or more signals in relation to the defined power level threshold.

17. The signal booster of claim 10, wherein the switchable multi-band pass filter is switched in based on the power level of the one or more signals in relation to the defined power level threshold, or the switchable multi-band pass filter is switched out based on the power level of the one or more signals in relation to the defined power level threshold.

18. A repeater, comprising:
    one or more detectors configured to detect a power level of the one or more signals prior to a bypassable amplifier and a switchable multi-band pass filter, an amplifier bypass path to enable the one or more signals to be directed from the one or more amplification and filtering signal paths to the amplifier bypass path to bypass the bypassable amplifier based on the power level of the one or more signals in relation to a defined power level threshold; and a band pass filter bypass path to enable the one or more signals to be directed from the one or more amplification and filtering signal paths to the band pass filter bypass path to:

bypass the switchable multi-band pass filter when the power level of the one or more signals is less than a defined power level threshold; and not bypass the switchable multi-band pass filter when the power level of the one or more signals is greater than the defined power level threshold, wherein the switchable multi-band pass filter is configured to be bypassed prior to a first stage of a downlink (DL) path in the one or more amplification and filtering signal paths in a weak signal area to reduce a noise figure.

19. The repeater of claim 18, wherein:
the signals bypass the bypassable amplifier to conserve energy based on the power level of the one or more signals in relation to the defined power level threshold; or
the signals do not bypass the bypassable amplifier based on the power level of the one or more signals in relation to the defined power level threshold.

20. The repeater of claim 18, wherein:
the switchable multi-band pass filter is switched in based on the power level of the one or more signals in relation to the defined power level threshold; or
the switchable multi-band pass filter is switched out based on the power level of the one or more signals in relation to the defined power level threshold.

21. The repeater of claim 18, wherein the signal amplifier is further configured to:
receive a downlink signal from a base station;
direct the downlink signal to a selected signal path for filtering and amplification of the downlink signal, wherein the signal path is selected based on a band associated with the downlink signal; and
transmit an amplified downlink signal to the wireless device.

22. The repeater of claim 18, wherein the signal amplifier is further configured to:
receive an uplink signal from the wireless device;
direct the uplink signal to a selected signal path for filtering and amplification of the uplink signal, wherein the signal path is selected based on a band associated with the uplink signal; and
transmit an amplified uplink signal to a base station.

23. The repeater of claim 18, wherein the signal booster is a cellular signal booster.

* * * * *